United States Patent
Meguro et al.

(10) Patent No.: US 12,104,317 B2
(45) Date of Patent: Oct. 1, 2024

(54) ARTIFICIAL LEATHER BASE MATERIAL, METHOD FOR PRODUCTION THEREOF, AND NAPPED ARTIFICIAL LEATHER

(71) Applicant: KURARAY CO., LTD., Kurashiki (JP)

(72) Inventors: Masashi Meguro, Okayama (JP); Hitoshi Nakatsuka, Saijo (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 17/269,593

(22) PCT Filed: Jul. 29, 2019

(86) PCT No.: PCT/JP2019/029718
§ 371 (c)(1),
(2) Date: Feb. 19, 2021

(87) PCT Pub. No.: WO2020/044911
PCT Pub. Date: Mar. 5, 2020

(65) Prior Publication Data
US 2021/0310186 A1   Oct. 7, 2021

(30) Foreign Application Priority Data

Aug. 27, 2018 (JP) ................. 2018-158799
May 29, 2019 (JP) ................. 2019-100328

(51) Int. Cl.
*D06N 3/14* (2006.01)
*D04H 1/4382* (2012.01)
(Continued)

(52) U.S. Cl.
CPC ............. *D06N 3/14* (2013.01); *D04H 1/4382* (2013.01); *D04H 1/43828* (2020.05);
(Continued)

(58) Field of Classification Search
CPC ...... D06N 3/14; D06N 3/0004; D06N 3/0011; D06N 3/0036; D06N 2209/1635; D06N 2211/28; D04H 1/43838; D04H 1/43835
See application file for complete search history.

(56) References Cited

U.S. PATENT DOCUMENTS 2,773,286 A * 12/1956 Piccard .................... D04H 1/64
521/61
5,503,899 A * 4/1996 Ashida ..................... D06N 3/14
428/156
(Continued)

FOREIGN PATENT DOCUMENTS

JP   2003286663 A  * 10/2003
JP   2007197889 A    8/2007
(Continued)

OTHER PUBLICATIONS

"JP2003286663_Machine Translation" is a machine translation of JP-2003286663-A. (Year: 2003).*
"JP2018003181_Machine Translation" is a machine translation of JP-2018003181-A. (Year: 2018).*

*Primary Examiner* — Larissa Rowe Emrich
(74) *Attorney, Agent, or Firm* — Element IP, PLC

(57) ABSTRACT

Disclosed is an artificial leather base material including: a non-woven fabric that is an entangle body of fibers (A) and fibers (B); and an elastic polymer applied inside the non-woven fabric, wherein the fibers (A) are crimped fibers that are formed from two types of resins with intrinsic viscosities different from each other, and that are filaments of 0.6 dtex or more, and the fibers (B) are ultrafine fibers of less than 0.6 dtex.

19 Claims, 1 Drawing Sheet

(51) Int. Cl.
  *D06N 3/00*   (2006.01)
  *D06N 3/12*   (2006.01)

(52) U.S. Cl.
  CPC ....... *D04H 1/4383* (2020.05); *D04H 1/43832* (2020.05); *D04H 1/43835* (2020.05); *D04H 1/43838* (2020.05); *D06N 3/0004* (2013.01); *D06N 3/0011* (2013.01); *D06N 3/0036* (2013.01); *D06N 3/123* (2013.01); *D06N 2209/1635* (2013.01); *D06N 2211/28* (2013.01)

(56)          References Cited

U.S. PATENT DOCUMENTS

| | | | |
|---|---|---|---|
| 6,716,776 B2 * | 4/2004 | Morishima | D04H 3/105 |
| | | | 442/104 |
| 2006/0008631 A1 * | 1/2006 | Takeyama | B32B 7/12 |
| | | | 427/206 |
| 2006/0234587 A1 * | 10/2006 | Horiguchi | D04H 1/492 |
| | | | 442/407 |
| 2015/0050460 A1 | 2/2015 | Fujisawa et al. | |

FOREIGN PATENT DOCUMENTS

| | | | |
|---|---|---|---|
| JP | 2009007730 A | | 1/2009 |
| JP | 2013194327 A | | 9/2013 |
| JP | 2017193794 A | | 10/2017 |
| JP | 2018003181 A | * | 1/2018 |
| WO | WO-2018047810 A1 | | 3/2018 |

* cited by examiner

ARTIFICIAL LEATHER BASE MATERIAL, METHOD FOR PRODUCTION THEREOF, AND NAPPED ARTIFICIAL LEATHER

TECHNICAL FIELD

The present invention relates to an artificial leather base material and a napped artificial leather that have good stretchability.

BACKGROUND ART

Conventionally, there have been known a napped artificial leather obtained by napping, in a suede-like or nubuck-like fashion, a surface of an artificial leather base material in which an elastic polymer has been applied into a non-woven fabric, and a grain-finished artificial leather obtained by stacking a polyurethane resin layer on a surface of an artificial leather base material. Such artificial leathers are widely used as the materials for clothing, shoes, articles of furniture, car seats, general merchandise, and the like. In recent years, as such artificial leathers, there has been a need for an artificial leather having good stretchability, which is the property of being elongated by being pulled, from the viewpoints of the wearing comfortability in uses for clothing and the moldability in uses for materials, as well as the ease of sewing and the tailored appearance.

PTL 1 listed below discloses a grain-finished artificial leather including a base material layer composed of ultrafine fibers having an average single fiber diameter of 0.1 to 10 μm and a porosified elastic polymer, and a resin layer formed on at least one side of the base material layer. The base material layer has a structure in which fiber bundles formed by ultrafine fibers are entangled with each other, and the ultrafine fibers of the base material have crimp in a cross section perpendicular to the thickness direction thereof on the surface of the base material layer that is in contact with the resin layer. Also, PTL 1 discloses that such a grain-finished artificial leather maintains a high peel strength, as well as a high elongation rate and a high elongation recovery rate, which are indicators of stretchability.

PTL 2 listed below discloses an artificial leather having good stretchability that includes a fiber inter-entangled body including ultrafine fibers with a single fiber fineness of 1.1 dtex or less and an elastic polymer, and has a napped surface, wherein the ultrafine fibers are latent crimped composite polyester fibers in which two types of polytrimethylene terephthalates having an intrinsic viscosity difference of 0.05 to 0.40 (dl/g) are composited side by side with each other.

PTL 3 listed below discloses a sheet-like material having good stretchability that includes a woven or knitted fabric including yarns containing side-by-side or eccentric sheath-core composite fibers formed from two or more types of polyethylene terephthalate-based polymers having an intrinsic viscosity (IV) difference, and ultrafine fibers having an average single fiber fineness of 0.001 dtex or more and 0.5 dtex or less, wherein the sheet-like material contains a self-emulsified polyurethane.

PTL 4 listed below discloses a sheet-like material having good stretchability that is an elastic artificial leather wherein (1) the strength $F_{5\%}$ at an elongation of 5% is 0.1 to 10 N/2.5 cm, and (2) $F_{20\%}/F_{5\%}$ is 5 or more in a relationship between the strength $F_{20\%}$ and the $F_{5\%}$ above at an elongation of 20%, on a stress-strain curve in a vertical direction, as measured by a method described in JIS L 1096 (1999) 8.14.1 A.

Although this is not a technique related to an artificial leather, PTL 5 listed below discloses a multilayer non-woven fabric in which a staple layer made from staples in which fiber ends are present and a filament fiber-main component layer mainly composed of filament fibers in which almost no fiber end is present are integrated by entanglement, wherein the fiber ends of the staples include entangled fiber ends at which the staples are entangled with each other, entangled fiber ends at which the staples are entangled with the filament fiber-main component layer so as to permeate thereinto, and exposed fiber ends at which the staples penetrate the filament fiber-main component layer so as to be exposed from a surface of the filament fiber-main component layer.

CITATION LIST

Patent Literatures

[PTL 1] Japanese Laid-Open Patent Publication No. 2018-003181
[PTL 2] Japanese Laid-Open Patent Publication No. 2003-286663
[PTL 3] Japanese Laid-Open Patent Publication No. 2009-7730
[PTL 4] Japanese Laid-Open Patent Publication No. 2013-194327
[PTL 5] Japanese Laid-Open Patent Publication No. 2017-193794

SUMMARY OF INVENTION

Technical Problem

Conventionally, there have been proposed artificial leathers having good stretchability. However, it is difficult to maintain high stretchability, enhanced mechanical properties and a napped feel when napped in good balance.

It is an object of the present invention to provide an artificial leather base material for obtaining an artificial leather having high stretchability, enhanced mechanical properties and a napped feel when napped in good balance, a method for producing the same, and a napped artificial leather that is obtained using the artificial leather base material.

Solution to Problem

An aspect of the present invention is directed to an artificial leather base material including: a non-woven fabric that is an entangle body of fibers (A) and fibers (B); and an elastic polymer applied inside the non-woven fabric, wherein the fibers (A) are crimped fibers that are formed from two types of resins with intrinsic viscosities different from each other, and that are filaments having an average fineness of 0.6 dtex or more, and the fibers (B) are ultrafine fibers having an average fineness of less than 0.6 dtex. Note that the average fineness is hereinafter also simply referred to as a "fineness".

The fibers (A) that are crimped fibers formed from two types of resins with intrinsic viscosities different from each other develop strong crimp. A non-woven fabric formed form such crimped fibers is bulky. In addition, the crimped fibers having strong crimp allow the artificial leather base material to achieve good stretchability. The fibers (A) that are filaments are less likely to fall out, and thus are less likely to reduce the stretchability.

Note that when a non-woven fabric formed only from the crimped fibers is used, it is difficult to obtain an artificial leather base material that achieves both enhanced mechanical properties and good stretchability in good balance. For example, in the case of a non-woven fabric formed only from the fibers (A), when the degree of entanglement of the fibers is too high, the mechanical properties are enhanced, but the stretchability is reduced. When the degree of entanglement is too low, the stretchability is increased, but the mechanical properties are reduced. As such, when a non-woven fabric formed only from the crimped fibers is used, it is not possible to obtain an artificial leather base material that achieves both high stretchability and enhanced mechanical properties.

On the other hand, as described above, with the use of a non-woven fabric formed by entangling the fibers (B) that are ultrafine fibers having an average fineness of less than 0.6 dtex with the fibers (A) that are crimped fibers and are filaments having an average fineness of 0.6 dtex or more, it is possible to obtain an artificial leather base material having both high stretchability and enhanced mechanical properties. By using the fibers (A) that are crimped fibers having strong crimp, the crimp makes it easy to entangle the fibers (A) with the fibers (B). As a result, an artificial leather base material having both high stretchability and enhanced mechanical properties is achieved. Also, the fibers (B) that are ultrafine fibers densify the fibers on the surface of the artificial leather base material, thereby providing a good napped appearance. Furthermore, in a non-woven fabric in which the fibers (A) that are crimped fibers and the fibers (B) that are ultrafine fibers are entangled, the fibers (B) also have the function of restricting, in a certain elongation range, the fibers (A) that are crimped fibers, which tend to cause yarns to be gradually fully elongated when repeatedly elongated and thus be difficult to be restored.

The fibers (A) have an average curvature of preferably 10% or more, and more preferably 15% or more, from the viewpoint of maintaining high stretchability. It is particularly preferable that the fibers (A) have an average curvature of 15% or more and the fibers (B) have an average curvature of less than 15%.

Preferably, the fibers (B) are staples having an average fiber length of less than 100 mm, because of good carding passability.

Preferably, the fibers (A) are side-by-side fibers or eccentric sheath-core fibers in which a difference between the intrinsic viscosities of the two types of resins is 0.05 (dl/g) or more, because crimped fibers having a high average curvature are likely to be obtained.

The two types of resins that form the fibers (A) are preferably polyesters.

Preferably, a mixing ratio ((A)/(B)) between the fibers (A) and the fibers (B) is 10/90 to 90/10, because it is possible to obtain an artificial leather base material that is more well-balanced in high stretchability and enhanced mechanical properties.

Preferably, the artificial leather base material has an average elongation rate of 10% or more when a load of 1 kg is applied thereto for 5 minutes, because it is possible to obtain an artificial leather base material having high stretchability.

Note that an artificial leather having good stretchability in which a non-woven fabric including the crimped fibers are impregnated with an elastic polymer has a problem in that yarns are gradually fully elongated when repeatedly elongated and thus are difficult to be restored. That is, an artificial leather using a non-woven fabric including the crimped fibers is less likely to maintain high stretchability after elongation is repeatedly performed. For example, as described in PTL 1, when a large amount of a porosified elastic polymer is contained in a non-woven fabric, the recovery force of the elastic polymer allows the non-woven fabric to maintain high stretchability even after elongation is repeatedly performed. However, when a large amount of an aqueous polyurethane is contained in a non-woven fabric because the usage amount of the solvent can be reduced, the non-woven fabric tends to be hard like a rubber, and be reduced in stretchability.

It is particularly preferable that, in the artificial leather base material, the elastic polymer is an aqueous polyurethane, and the artificial leather base material has a content ratio of the aqueous polyurethane of 8 to 15 mass %, and an average void area in a cross section in a thickness direction thereof, of 300 to 1000 $\mu m^2$. Such an artificial leather base material is less likely to reduce the stretchability even after repeated elongation.

When the content ratio of the aqueous polyurethane is 8 to 15 mass %, the fibers are moderately restrained to maintain the stretchability, without making the artificial leather base material hard like a rubber. Also, by sufficiently entangling the fibers (A) and the fibers (B) to adjust the average void area in a cross section in the thickness direction to 300 to 1000 $\mu m^2$ such that the area per void has an appropriate size, it is possible to obtain an artificial leather base material having good stretchability with an elongation rate and an elongation recovery rate at a certain level or higher even after repeated elongation.

Another aspect of the present invention is directed to a napped artificial leather including any of the above-described artificial leather base materials, wherein one side of the artificial leather base material is napped. Such a napped artificial leather is well-balanced in stretchability and mechanical properties, and can have a napped surface having dense naps.

Another aspect of the present invention is directed to a method for producing the above-described artificial leather base material, including at least the steps of: preparing a first fiber web including crimped-type fibers (A1) for forming the fibers (A), the crimped-type fibers (A1) being formed from two types of resins with intrinsic viscosities different from each other and being filaments of 0.6 dtex or more; preparing a second fiber web of ultrafine fiber-generating fibers (B1) for forming the fibers (B); stacking the second fiber web on at least one side of the first fiber web to form a stacked web; forming an entangled fiber sheet in which the crimped-type fibers (A1) and the ultrafine fiber-generating fibers (B1) that form the stacked web are entangled; heat-shrinking the entangled fiber sheet to form a heat-shrunk fiber sheet; subjecting the ultrafine fiber-generating fibers (B1) that form the heat-shrunk fiber sheet to an ultrafine fiber-generating treatment, thereby forming a non-woven fabric that is an entangle body of the crimped-type fibers (A1) and the fibers (B); and applying, by impregnation, an elastic polymer to the heat-shrunk fiber sheet or the non-woven fabric. Note that the crimped-type fibers are fibers for forming the fibers (A) that are crimped fibers, and include actual crimped-type fibers that have crimp upon being formed into a web, and latent crimped-type fibers that do not develop crimp upon being formed into a web, but are crimped by a heat treatment performed in a subsequent step. According to such a method, it is possible to obtain the above-described artificial leather base material having high stretchability and enhanced mechanical properties, as well as a good napped feel when napped.

Preferably, the stacked web is a stack in which the second fiber web is stacked on both sides of the first fiber web, because it is possible to obtain an artificial leather base material that is well-balanced in high stretchability and mechanical properties.

Preferably, the step of applying the elastic polymer by impregnation is a step of impregnating the heat-shrunk fiber sheet or the non-woven fabric with a polyurethane aqueous emulsion, and subsequently drying the polyurethane aqueous emulsion, thereby producing an aqueous polyurethane. The usage amount of the solvent can be reduced by impregnating the heat-shrunk fiber sheet or the non-woven fabric with a polyurethane aqueous emulsion, and subsequently drying the polyurethane aqueous emulsion, to produce a non-spongy polyurethane. Note that an aqueous polyurethane tends to restrain fibers, and an excessively high adding ratio of the aqueous polyurethane is likely to cause a reduction in the stretchability. Therefore, the content ratio of the aqueous polyurethane is preferably less than 20%. On the other hand, when the artificial leather base material is impregnated with a solvent-based polyurethane, to produce a spongy polyurethane, an elastic polymer having high elasticity can be applied into the artificial leather base material. Because the solvent-based polyurethane is less likely to firmly restrain fibers, an artificial leather base material having both high stretchability and enhanced mechanical properties is likely to be obtained even when the solvent-based polyurethane is contained in an amount of 20% or more.

Preferably, the crimped-type fibers (A1) are crimped-type fibers that have been spun at a spinning draft of 400 or more and that have a fineness of 0.6 dtex or more, and the method produces an artificial leather base material having a content ratio of the aqueous polyurethane of 8 to 15 mass % and an average void area in a cross section in a thickness direction thereof, of 300 to 1000 $\mu m^2$, because an artificial leather base material that does not excessively reduce the stretchability even after repeated elongation is likely to be obtained.

Advantageous Effects of Invention

According to the present invention, it is possible to obtain an artificial leather base material having high stretchability, enhanced mechanical properties and a napped feel when napped in good balance.

DESCRIPTION OF EMBODIMENT

Figure 1:
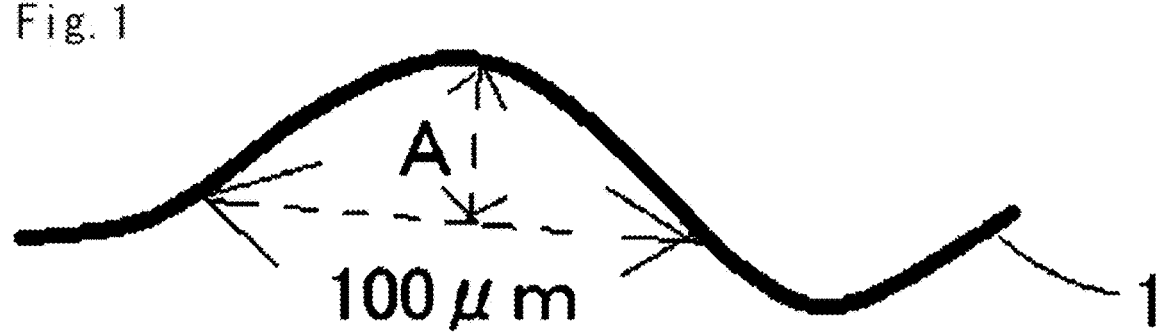
FIG. 1 is an explanatory diagram illustrating an average curvature.

An artificial leather base material according to the present embodiment is an artificial leather base material including: a non-woven fabric that is an entangle body of fibers (A) and fibers (B); and an elastic polymer applied inside the non-woven fabric, wherein the fibers (A) are crimped fibers that are formed from two types of resins with intrinsic viscosities different from each other, and that are filaments having an average fineness (hereinafter also referred to as a "fineness") of 0.6 dtex or more, and the fibers (B) are ultrafine fibers having an average fineness of less than 0.6 dtex.

Hereinafter, the artificial leather base material of the present embodiment will be described in detail, in conjunction with an exemplary production method thereof.

The above-described artificial leather base material can be produced by a production method including at least the following steps.

Step (1): Step of preparing a first fiber web including crimped-type fibers (A1) that are formed from two types of resins with intrinsic viscosities different from each other, and that are filaments of 0.6 dtex or more Step (2): Step of preparing a second fiber web of ultrafine fiber-generating fibers (B1) for forming fibers (B) that are ultrafine fibers of less than 0.6 dtex Step (3): Step of stacking the second fiber web on at least one side of the first fiber web to form a stacked web Step (4): Step of forming an entangled fiber sheet in which the crimped-type fibers (A1) and the ultrafine fiber-generating fibers (B1) that form the stacked web are entangled Step (5): Step of heat-shrinking the entangled fiber sheet to form a heat-shrunk fiber sheet Step (6): Step of subjecting the ultrafine fiber-generating fibers (B1) that form the heat-shrunk fiber sheet to an ultrafine fiber-generating treatment, thereby forming a non-woven fabric that is an entangle body of the crimped-type fibers (A1) and the fibers (B)

Step (7): Step of applying, by impregnation, an elastic polymer to the heat-shrunk fiber sheet or the non-woven fabric (1) Preparation Step of First Fiber Web In the production of an artificial leather base material according to the present embodiment, a first fiber web of crimped-type fibers (A1) that are formed from two types of resins with intrinsic viscosities different from each other, and that are filaments having an average fineness of 0.6 dtex or more is produced.

Examples of the production method of the first fiber web include a method in which the crimped-type fibers (A1) are spun by melt spinning, using the so-called spunbonding, and the resulting fibers are collected on a net without being cut, to form a filament web of continuous fibers, and a method in which the crimped-type fibers (A1) are spun by melt spinning, then are drawn, and subsequently are crimped as needed, and the row fibers that have been cut into an average fiber length of 100 mm or more are passed through a carding machine so as to be formed into a web. The crimped-type fibers (A1) are fibers for forming the fibers (A) that are crimped fibers formed from two types of resins with intrinsic viscosities different from each other, and may be either actual crimped-type fibers that have crimp upon being formed into a web, or latent crimped-type fibers that do not develop crimp upon being formed into a web, but are crimped by a heating treatment performed in a subsequent step. Among these, the method in which a filament web of continuous fibers are formed using spunbonding is preferable because the mechanical properties are likely to be further enhanced. Note that in the method in which the cut row fibers are passed through a carding machine so as to be formed into a web, it tends to be difficult to pass the row fibers through the carding machine.

The crimped-type fibers (A1) are filaments. Preferably, the filaments in the present embodiment may be continuous fibers having an average fiber length of 100 mm or more, preferably 200 mm or more, and furthermore, may be continuous fibers that have been produced by spunbonding and have been continuously spun, and have a fiber length of, for example, several meters, more preferably several hundred meters, and particularly preferably several kilometers, or more. When the crimped-type fibers (A1) are filaments, the crimped-type fibers are less likely to fall out, and exhibit high stretchability. When the fibers (A) are staples having an average fiber length of less than 100 mm, the fibers (A) are likely to fall out, so that the stretchability of the artificial leather base material tends to be reduced. In the present embodiment, the method for producing the first fiber web using spunbonding will be described in detail as a representative example.

Examples of the resins for forming the crimped-type fibers (A1) formed from two types of resins with different intrinsic viscosities include polyester-based resins such as polyethylene terephthalate (PET), which is a copolymer of a terephthalic acid unit and an ethylene glycol unit, polybutylene terephthalate (PBT), which is a copolymer of a terephthalic acid unit and a 1,4-butane diol unit, polytrimethylene terephthalate (PTT) and polyester elastomers, or modified polyester-based resins such as modified products thereof; and polyamide-based resins such as polyamide 6, polyamide 66, polyamide 610, aromatic polyamides, and polyamide elastomers, or modified polyamide-based resins such as modified products thereof. Among these, polyester-based resins are preferable because fibers that develop high crimp are likely to be obtained.

Note that the modified product means a polymer in which part of a main polymer forming unit is replaced by a small amount of another monomer unit for the purpose of adjusting the intrinsic viscosity, the melting point, or the crystallinity of a resin. Examples of a small amount of the monomer unit for modifying a polyester include asymmetric aromatic carboxylic acids such as isophthalic acid, phthalic acid and 5-sodium sulfoisophthalic acid, aliphatic dicarboxylic acids such as adipic acid, and diols such as ethylene glycol, butane diol, neopentyl glycol, cyclohexane dimethanol, polyethylene glycol, and polypropylene glycol. By introducing these monomer units into a polyester, it is possible to adjust the intrinsic viscosity, the melting point, or the crystallinity of the polyester.

Examples of the crimped-type fibers (A1) formed from two types of resins with different intrinsic viscosities include side-by-side fibers and eccentric sheath-core fibers having an eccentric sheath-core cross section. The side-by-side fibers are fibers formed such that two types of resins with intrinsic viscosities different from each other during melt spinning are attached together along the length direction of the fibers. The eccentric sheath-core fibers are fibers having a sheath-core cross section in which one of two types of resins with intrinsic viscosities different from each other during melt spinning forms the core portion, and the other resin forms the sheath portion, the eccentric sheath-core fibers being asymmetrically arranged with the core portion displaced from the center in the sheath-core cross section. Such crimped-type fibers develop strong crimp after being spun, or by a subsequent heat treatment.

The combination of the two types of resins for forming the crimped-type fibers may be selected as appropriate according to the degree of stretchability that is to be achieved, and the required entanglement state of the non-woven fabric depending on the use. Specifically, for example, PET and PBT, PET and PET, PBT and PBT, or PBT and PTT may be selected as appropriate according to the required properties. Note that at least one of the two resins of each of these combinations may be a modified product. Among these, the combination of PET and PBT is preferable because an artificial leather base material having good stretchability is likely to be obtained by the fibers (A) developing strong crimp.

The difference between the intrinsic viscosities of the two types of resins is preferably 0.05 dl/g or more, and more preferably 0.1 to 0.6 dl/g, because the fibers (A) develop strong crimp that contributes to the achievement of stretchability. When the intrinsic viscosity difference is too small, strong crimp is less likely to be developed. When the intrinsic viscosity difference is too large, the melt spinnability tends to be reduced because the oblique movement of the resins becomes violent on the nozzle surface after the resins are discharged from the nozzle.

As the intrinsic viscosities of the two types of resins with different intrinsic viscosities, the intrinsic viscosity of the resin having a higher intrinsic viscosity is preferably 0.6 to 1.2 dl/g, and more preferably 0.62 to 1.1 dl/g, because of good melt spinnability and good mechanical properties.

The ratio of the resin having a higher viscosity of the two types of resins is preferably 30 to 70 mass %, and more preferably 40 to 60 mass %, because strong crimp is likely to be developed.

Each of the two types of resins may contain, as needed, additives such as organic particles, inorganic particles, a flame retardant, and an antistatic agent.

The first fiber web can be produced by spunbonding in which two types of molten resins discharged from the respective nozzle holes of a multicomponent fiber melt-spinning spinneret in which the two types of resins are arranged are brought into contact with each other, and the resins are further continuously discharged from a spinning nozzle at a predetermined discharge rate, and are drawn while being cooled with a high-velocity air stream, to be piled on a movable net in the form of a conveyor belt. Additionally, the filament webs piled on the net may be hot-pressed so as to be provided with shape stability.

Although the melt spinning conditions are not particularly limited, for example, the following conditions are preferable in that fibers (A) that develop high crimp can be obtained, and that it is possible to obtain an artificial leather base material for which stretchability after repeated elongation can be easily maintained.

For example, the melt spinning can be performed under conditions set such that, where A (g/min) is the discharge rate of the molten resin discharged from one hole of the spinning nozzle, B (g/cm$^3$) is the melt density of the resin, C (mm$^2$) is the area per hole, and D (m/min) is the spinning rate, the spinning draft calculated by the following formula is 400 or more, even in the range of 400 to 1600, and particularly 700 to 1600.

$$\text{Spinning draft} = D/(A/B/C)$$

The average fineness of the crimped-type fibers (A1) and the fibers (A) that are crimped fibers is 0.6 dtex or more, preferably 0.6 to 2.5 dtex, more preferably 0.6 to 2 dtex, and particularly preferably 0.6 to 1.5 dtex. When the average fineness of the crimped-type fibers (A1) and the fibers (A) that are crimped fibers is less than 0.6 dtex, the entanglement is insufficient, so that the mechanical properties tend to be reduced.

With such a method, it is possible to obtain a first fiber web including the crimped-type fibers (A1) that are formed from two types of resins with intrinsic viscosities different from each other and that are filaments having a fineness of 0.6 dtex or more. The crimped-type fibers (A1) are actual crimped fibers that are crimped fibers in the present step, or latent crimped fibers that develop crimp by a subsequent heat treatment, the crimped-type fibers (A1) being filaments having an average fineness of 0.6 dtex or more.

(2) Preparation Step of Second Fiber Web

A second fiber web including ultrafine fiber-generating fibers (B1) for forming fibers (B) that are ultrafine fibers of less than 0.6 dtex is prepared.

Examples of the production method of the second fiber web include a method in which the ultrafine fiber-generating fibers are spun using melt spinning, then are drawn, and subsequently are provided with crimp as needed, and the row fibers that have been cut are passed through a carding machine, so as to be formed into a web, and a method in which the ultrafine fiber-generating fibers are spun using melt spinning, using spunbonding, and the resulting fibers are collected on a net without being cut, to form a filament web of continuous fibers. Although the ultrafine fiber-generating fibers may be either staples or filaments, it is particularly preferable to use a stable web because of the good carding passability, and also because an artificial leather base material having particularly good mechanical properties and particularly good napped feel when napped is likely to be obtained. In the present embodiment, the production of a staple web will be described in detail as a representative example.

The ultrafine fiber-generating fibers (B1) are fibers that form ultrafine fibers with a small fineness as a result of performing a chemical post-treatment or a physical post-treatment on the spun fibers. Specific examples thereof include island-in-the-sea conjugated fibers and strip/division-type conjugated fibers. An island-in-the-sea conjugated fiber is a conjugated fiber in which an island component resin serving as a domain different from a sea component serving as a matrix is dispersed in the sea component resin in a cross section of the fiber, and ultrafine fibers in the form of a fiber bundle composed mainly of the island component resin is produced as a result of the sea component being removed therefrom. A strip/division-type conjugated fiber is a conjugated fiber in which a plurality of different resins are alternately disposed around the periphery of the fiber to form a petaline shape or a superposed shape, and ultrafine fibers in the form of a bundle are formed as a result of the fiber being divided by the resins being stripped therefrom by a physical treatment. With the island-in-the-sea conjugated fibers, fiber bundles of ultrafine fibers inside of which voids are retained are formed, and therefore a flexible artificial leather base material is likely to be obtained, and enhanced mechanical properties are also likely to be achieved. In the present embodiment, the formation of ultrafine fibers by using the island-in-the-sea conjugated fibers will be described in detail as a representative example.

The island-in-the-sea conjugated fibers are multicomponent conjugated fibers composed of at least two polymers, and form fiber bundle-like ultrafine fibers made of the island component by removing the sea component by extraction or decomposition in a later stage.

Specific examples of the thermoplastic resin serving as the island component of the island-in-the-sea conjugated fibers include polyester-based resins such as PET, PBT, PTT, and a polyester elastomer; polyamide-based resins such as polyamide 6, polyamide 66, polyamide 610, aromatic polyamide, and a polyamide elastomer; acrylic resins; and olefin resins. These may be modified products. Also, these may be used alone or in a combination of two or more.

On the other hand, specific examples of the thermoplastic resin serving as the sea component include polyvinyl alcohol-based resins, polyethylene, polypropylene, polystyrene, ethylene-propylene copolymers, ethylene-vinyl acetate copolymers, styrene-ethylene copolymers, and styrene-acrylic copolymers. Among these, polyvinyl alcohol-based resins, in particular, an ethylene-modified polyvinyl alcohol resin having water solubility is preferable because it can be easily shrunk in a heat moisture treatment or a hot water treatment.

The mass ratio between the sea component and the island component of the island-in-the-sea conjugated fibers is preferably in the range of sea component:island component=5:95 to 80:20.

Specific examples of the production method of the island-in-the-sea conjugated fibers include a method in which the island-in-the-sea conjugated fibers are spun using melt spinning, using a multicomponent fiber spinning spinneret having multiple nozzle holes arranged in a predetermined pattern, then are drawn, and subsequently are further provided with crimp as needed, and the row fibers that have been cut are passed through a carding machine, so as to be formed into a web. If necessary, the web of the island-in-the-sea conjugated fibers may be hot-pressed so as to be provided with shape stability.

When the fibers (B) are formed from the island-in-the-sea conjugated fibers, the number of ultrafine fibers forming a fiber bundle is, for example, preferably 5 to 200, more preferably 10 to 50, and particularly preferably 10 to 30.

The ultrafine fiber-generating fibers (B1) in the web are subjected to an ultrafine fiber-generating treatment at a later time, and are thereby converted into fibers (B) that are ultrafine fibers having an average fineness of less than 0.6 dtex.

The average fiber length of the fibers (B) is not particularly limited, and the fibers (B) may be staples having a length of less than 100 mm, or, the fibers (B) may be fibers having a fiber length of 100 mm or more, even 200 mm or more, in particular, for example, several meters, even several hundred meters, and particularly several kilometers, or more that have been produced into a web by spunbonding, continuously from spinning. When the fibers (B) are staples having an average fiber length of less than 100 mm, an average fiber length of 40 to 75 mm is preferable because of the good carding passability. In addition, the fibers (B) are preferably fibers that have been drawn after being spun, because it is possible to obtain an artificial leather base material having better mechanical properties.

(3) Step of Forming a Stacked Web in which the Second Fiber Web is Stacked on at Least One Side of the First Fiber Web Next, a stacked web is formed by stacking the first fiber web and the second fiber web on each other.

Examples of the production method of the stacked web include cross lapping in which about 4 to 100 sheets of the first fiber webs and the second fiber webs are stacked using a cross lapper such that the second fiber web is disposed on at least one side, preferably both sides of each the first fiber web. If necessary, a woven fabric, a knitted fabric, or another non-woven fabric may also be stacked as long as the effects of the present invention are not impaired.

Note that, in cross lapping, it is preferable that an oil solution for preventing the needle from breaking, an antistatic agent, or the like is applied to the surface of the fibers used, or the surface of the fiber webs in order to prevent the needles from breaking or being damaged during needle punching.

The ratio between the first fiber web and the second fiber web is not particularly limited, but is preferably such that the ratio ((A)/(B)) between the fibers (A) and the fibers (B) that are ultrafine fibers in the resulting final non-woven fabric is preferably 10/90 to 90/10, and more preferably 15/85 to 85/15.

(4) Step of Entangling the Crimped-Type Fibers (A1) and the Ultrafine Fiber-Generating Fibers (B1) of the Stacked Web to Form an Entangled Fiber Sheet Next, an entangled fiber sheet is formed by entangling the crimped-type fibers (A1) of the first fiber web and the ultrafine fiber-generating fibers (B1) of the second fiber web that form the stacked web. The entangled fiber sheet is formed by subjecting the stacked web to an entangling treatment by using a known non-woven fabric production method such as needle punching or high-pressure water jetting. In the present embodiment, an entangling treatment by needle punching will be described in detail as a representative example.

A silicone-based oil solution or a mineral oil-based oil solution such as an oil solution for preventing the needle from breaking, an antistatic oil solution, or an entangling enhancing oil solution is applied to the stacked web. Thereafter, an entangling treatment is performed in which the crimped-type fibers (A1) and the ultrafine fiber-generating fibers (B1) are three-dimensionally entangled by needle punching.

In a needle punching treatment, for example, needle punching is performed under the condition that at least one or more barbs penetrate the stacked web simultaneously or alternately from one side or both sides thereof. The punching density is dependent on the basis weight, the fiber density, and the like of the stacked web, but is preferably 1000 to 3000 fibers/cm$^2$, and more preferably 1200 to 2500 fibers/cm$^2$, because high stretchability is maintained as a result of the fibers being suitably entangled, and enhanced mechanical properties are also maintained.

The fibers (B) that are ultrafine fibers formed from the ultrafine fiber-generating fibers (B1) and having an average fineness of less than 0.6 dtex contribute to achieving both the enhanced mechanical properties and the high stretchability of the resulting artificial leather base material.

In the case of using a stacked web including only the fibers (A) that are crimped fibers, and not including the fibers (B) that are ultrafine fibers, it is difficult to achieve both enhanced mechanical properties and high stretchability. Specifically, when the mechanical properties are insufficient in the case of using a stacked web including only the fibers (A), the stretchability tends to be reduced if the punching density is increased to more firmly restrain the fibers in order to enhance the mechanical strength. Also, even if the punching density is to be increased, the mechanical strength tends not to be sufficiently enhanced due to the occurrence of fiber breakage. When the stretchability is insufficient, if the stretchability is to be increased by reducing the punching density to loosen the restraint of the fibers, the mechanical properties are reduced. In the production of the artificial leather base material of the present embodiment, both the enhanced mechanical properties and the high stretchability of the artificial leather base material can be achieved in the case of using a stacked web including the fibers (B) and the fibers (A).

The basis weight of the thus produced entangled fiber sheet in which the fibers (A1) and the ultrafine fiber-generating fibers (B1) of the stacked web are entangled is not particularly limited, but is preferably 100 to 1000 g/m$^2$, and more preferably 200 to 900 g/m$^2$, because an artificial leather base material having both enhanced mechanical properties and high stretchability can be obtained, and also suitable processability can be achieved.

(5) Step of Heat-Shrinking the Entangled Fiber Sheet to Form a Heat-Shrunk Fiber Sheet Next, the entangled fiber sheet is heat-shrunk, thereby increasing the fiber density and the degree of entanglement of the entangled fiber sheet, causing the fibers (A1) to develop crimp, and enhancing crimp that has been already developed. Specific examples of the heat shrinking treatment include a method involving continuously bringing the entangled fiber sheet into contact with water vapor, and a method involving applying water to the entangled fiber sheet, and subsequently heating the water by using hot air or electromagnetic waves such as infrared rays. For the purpose of, for example, further densifying the entangled fiber sheet that has been densified by the heat shrinking treatment, as well as fixing the shape and smoothing the surface thereof, additional hot pressing may be performed as needed.

The change in the basis weight of the entangled fiber sheet during the heat-shrinking treatment step is preferably 1.1 times (mass ratio) or more the basis weight before the shrinking treatment, more preferably 1.3 times or more and 2 times or less, more preferably 1.6 times or less.

The basis weight of the thus formed heat-shrunk fiber sheet is not particularly limited, but is preferably 200 to 2000 g/m$^2$, and more preferably 400 to 1800 g/m$^2$, because it is possible to obtain an artificial leather base material that is well-balanced in the mechanical properties and the stretchability, and moderate processability can be achieved.

(6) Step of Subjecting the Ultrafine Fiber-Generating Fibers (B1) that Form the Heat-Shrunk Fiber Sheet to an Ultrafine Fiber-Generating Treatment, Thereby Forming a Non-Woven Fabric that is an Entangle Body of the Crimped-Type Fibers (A1) and the Fibers (B) Having an Average Fineness of Less than 0.6 dtex In the present step, the ultrafine fiber-generating fibers in the heat-shrunk fiber sheet are subjected to an ultrafine fiber-generating treatment, thereby forming a non-woven fabric that is an entangle body of the crimped-type fibers (A1) that are formed from two types of resins with intrinsic viscosities different from each other and that are filaments of 0.6 dtex or more, and the fibers (B) that are ultrafine fibers having an average fineness of less than 0.6 dtex. In the present embodiment, a case where the ultrafine fiber-generating fibers are island-in-the-sea conjugated fibers will be described in detail as a representative example.

A non-woven fabric that is an entangle body of the crimped-type fibers (A1) and the fibers (B) that are ultrafine fibers is formed by converting the island-in-the-sea conjugated fibers contained in the heat-shrunk fiber sheet into ultrafine fibers in the form of fiber bundles by removing the sea component from the island-in-the-sea conjugated fibers by extraction or decomposition with water, a solvent, or the like. For example, in the case of island-in-the-sea conjugated fibers using a water-soluble polyvinyl alcohol-based resin as the sea component, the water-soluble polyvinyl alcohol-based resin serving as the sea component is removed by subjecting the island-in-the-sea conjugated fibers to hot-water heating with water, an aqueous alkaline solution, an aqueous acidic solution, or the like.

The fibers (B) that are ultrafine fibers are ultrafine fibers having an average fineness of less than 0.6 dtex, and have an average fineness of preferably 0.01 to 0.55 dtex, and more preferably 0.05 to 0.5 dtex. The fibers (B) that are such ultrafine fibers exhibit a napped feel of fine fibers when the surface of the artificial leather base material is napped.

The number of ultrafine fibers forming a fiber bundle of the fibers (B) that are ultrafine fibers formed from the island-in-the-sea conjugated fibers is, for example, preferably 5 to 200, more preferably 10 to 50, and particularly preferably 10 to 30. When the fibers (B) are present as fiber bundles of ultrafine fibers, the fibers (B) exhibit a higher mechanical strength.

The basis weight of the thus formed non-woven fabric that is an entangle body of the crimped-type fibers (A1) and the fibers (B) is not particularly limited, but is, for example, preferably 100 to 1000 g/m$^2$, and more preferably 200 to 600 g/m$^2$.

(7) Step of Applying, by Impregnation, an Elastic Polymer to the Heat-Shrunk Fiber Sheet or the Non-Woven Fabric In the production of the artificial leather base material, an elastic polymer is applied by impregnation to the heat-shrunk fiber sheet obtained in Step (5) or the non-woven fabric obtained in Step (6) in order to impart shape stability to the artificial leather base material and also to enhance the fullness thereof. It is preferable that an elastic polymer is applied by impregnation to the heat-shrunk fiber sheet obtained in Step (5), because the ultrafine fiber-generating fibers are subjected to an ultrafine fiber-generating treatment in Step (6) after the elastic polymer has been applied, so that the formed fibers (B) of ultrafine fibers are not restrained by the elastic polymer, thus making it possible to obtain an artificial leather base material having higher stretchability.

Specific examples of the elastic polymer include polyurethanes; acrylic elastic bodies; polyamide-based elastic bodies such as polyamide elastomers; polyester-based elastic bodies such as polyester elastomers; polystyrene-based elastic bodies; and polyolefin-based elastic bodies.

The content ratio of the elastic polymer is preferably 5 to 50 mass %, more preferably 5 to 40 mass %, and particularly preferably 10 to 30 mass %, relative to the total amount of the elastic polymer and the non-woven fabric that is an entangle body of the fibers (A) and the fibers (B), because it is possible to obtain an artificial leather base material having good shape stability and good fullness, as well as good stretchability. When the content ratio of the elastic polymer is too low, the shape stability tends to be reduced, or the stretchability tends to be reduced because the fibers are likely to fall out. When the content ratio of the elastic polymer is too high, the texture tends to be rubber-like, or the stretchability tends to be reduced. When the content ratio of the elastic polymer is 8 to 15 mass % relative to the total amount of the elastic polymer and the non-woven fabric that is an entangle body of the fibers (A) and the fibers (B), the elongation recovery rate after repeated elongation is particularly good.

Among the elastic polymers, polyurethanes are particularly preferable in terms of good flexibility and good fullness. As for the properties, the polyurethane may be, for example, an aqueous polyurethane prepared as an aqueous emulsion, and a solvent-based polyurethane dissolved in a solvent containing N, N-dimethylformamide (DMF) and prepared as a solution.

Examples of the method for applying the elastic polymer by impregnation include a method involving impregnating the heat-shrunk fiber sheet or the non-woven fabric with a solvent-based polyurethane, followed by wet-coagulation, to apply a sponge-like polyurethane. In the case of using such a method, an elastic polymer having good elasticity can be applied into the artificial leather base material. Note that, because the solvent-based polyurethane is less likely to firmly restrain fibers, an artificial leather base material having both high stretchability and enhanced mechanical properties is likely to be obtained even when the solvent-based polyurethane is contained in an amount of 20% or more.

Other examples of the method for applying the elastic polymer by impregnation include a method involving impregnating the heat-shrunk fiber sheet or the non-woven fabric with a polyurethane aqueous emulsion, followed by drying, to apply an aqueous polyurethane. In the case of using such a method, the usage amount of the solvent can be reduced. Note that an aqueous polyurethane tends to restrain fibers, and an excessively high adding ratio of the aqueous polyurethane is likely to cause a reduction in the stretchability. Therefore, the content ratio of the aqueous polyurethane is preferably less than 20%.

In the production of the artificial leather base material of the present embodiment, an aqueous polyurethane is particularly preferable because it can be treated in a relatively short time, minimize unnecessary tension and thus can achieve high stretchability, and has a low environmental load, although the present invention is not limited thereto.

The aqueous polyurethane can be prepared as an aqueous emulsion or an aqueous suspension. Also, the aqueous polyurethane may be crosslinked for the purpose of increasing the water resistance, the abrasion resistance, and the hydrolysis resistance. The crosslinking agent for crosslinking the aqueous polyurethane may be an external crosslinking agent that is added to the aqueous polyurethane as a third component, or may be an internal crosslinking agent that introduces, into the molecular structure of the aqueous polyurethane, a reaction site serving as a crosslinked structure in advance. Examples of the crosslinking agent include compounds including an isocyanate group, an oxazoline group, a carbodiimide group, an epoxy group, a melamine resin, and a silanol group.

When the content ratio of the aqueous polyurethane is 8 to 15 mass %, relative to the total amount of the aqueous polyurethane and the non-woven fabric that is an entangle body of the fibers (A) and the fibers (B), it is possible to obtain an artificial leather base material having good shape stability and good fullness, as well as a good elongation recovery rate after repeated elongation. When the content ratio of the aqueous polyurethane is less than 8 mass %, the shape stability tends to be reduced, or the elongation recovery rate after repeated elongation tends to be reduced because the fibers are likely to fall out. When the content ratio of the aqueous polyurethane is too high, the texture tends to be rubber-like.

As the method for applying the elastic polymer into the heat-shrunk fiber sheet or the non-woven fabric by impregnation, it is preferable to use, for example, in the case of using an emulsion of an aqueous polyurethane, dip-nipping in which a treatment of dipping the heat-shrunk fiber sheet or the non-woven fabric in a bath filled with the emulsion of the aqueous polyurethane, and subsequently nipping the heat-shrunk fiber sheet or the non-woven fabric by using a press roll or the like to achieve a predetermined impregnated state is performed once or a plurality of times. As another method, it is possible to use bar coating, knife coating, roll coating, comma coating, spray coating, or the like.

The aqueous polyurethane can be applied, by impregnation, to the heat-shrunk fiber sheet or the non-woven fabric by impregnating the heat-shrunk fiber sheet or the non-woven fabric with an emulsion or a suspension of the aqueous polyurethane, and performing coagulation by a dry method in which the aqueous polyurethane is dry-coagulated. Note that, in order to crosslink the coagulated aqueous polyurethane, it is also preferable to perform a curing treatment by further heating after drying.

If necessary, the elastic polymer may contain a pigment such as carbon black, a dye, an antifungal agent, an antioxidant, an ultraviolet absorber, a light resisting agent such as a photostabilizer, a flame retardant, a penetrant, a lubricant, an anti-blocking agent such as silica and titanium oxide, a water-repellent agent, a viscosity adjustor, a surfactant such as an antistatic agent, an antifoaming agent such as silicone, a filler such as cellulose, a coagulation adjustor, and inorganic particles such as silica and titanium oxide.

Through the above-described steps, an artificial leather base material is obtained. The obtained artificial leather base material is dried, and subsequently is finished by being sliced into a plurality of pieces in a direction perpendicular to the thickness direction or ground so as to adjust the thickness and the surface state. Additionally, a napped surface in which at least one side of the artificial leather base material is napped, or a grain-finished resin layer may be formed. The artificial leather base material of the present embodiment is particularly preferably used for the production of a napped artificial leather that is napped on at least one side, because it provides a good napped feel for a napped surface formed thereon by napping.

In napping, the surface layer of the artificial leather base material is napped by being buffed by using sand paper or the like, to obtain a suede-like or nubuck-like texture. In addition to napping, a finishing treatment such as a flexibilizing treatment by crumpling, a reverse seal brushing treatment, an antifouling treatment, a hydrophilization treatment, a lubricant treatment, a softener treatment, an antioxidant treatment, an ultraviolet absorber treatment, a fluorescent agent treatment, and a flame retardant treatment may be performed as needed.

Preferably, the artificial leather base material thus obtained is further dyed. Dyeing is performed by appropriately selecting a dye composed mainly of a disperse dye, a reactive dye, an acidic dye, a metal complex dye, a sulfur dye, a sulfur vat dye or the like according to the type of fibers, and using a known dyeing machine commonly used for fiber dyeing, such as a padder, jigger, circular or wince dyeing machine. For example, when the ultrafine fibers are polyester-based ultrafine fibers, it is preferable to perform dyeing by high-temperature and high-pressure dyeing by using a disperse dye.

An artificial leather base material obtained by the above-described production method of the present embodiment, or an artificial leather using the same comprises an artificial leather base material: a non-woven fabric that is an entangle body of fibers (A) and fibers (B); and an elastic polymer applied inside the non-woven fabric, wherein the fibers (A) are crimped fibers that are formed from two types of resins with intrinsic viscosities different from each other, and that are filaments having an average fineness of 0.6 dtex or more, and the fibers (B) are ultrafine fibers having an average fineness of less than 0.6 dtex.

In the artificial leather base material obtained in the present embodiment or an artificial leather using the same, at least the fibers (A) are strongly crimped, and stretchability is achieved by the strong crimp. Here, "crimped fibers" mean fibers having an average curvature, as measured in the manner described below, of 10% or more. The crimp of the fibers (A) has an average curvature of preferably 14% or more, particularly preferably 15% or more, and even more preferably 20% or more, because high stretchability can be achieved.

Preferably, the fibers (B) are weakly crimped ultrafine fibers. Here "weakly crimped" means having an average curvature, as measured in the manner described below, of less than 14%, even less than 13.5%, and particularly less than 11%. In the artificial leather base material, the elongation of the fibers (A) is restricted within a certain range by the fibers (B) being integrated with the fibers (A) by entanglement.

With the artificial leather base material obtained in the present embodiment, it is possible to obtain an artificial leather having stretchability, mechanical properties and a napped feel when napped in good balance. The stretchability of the artificial leather base material or an artificial leather using the same has an average elongation rate of preferably 10% or more, more preferably 15% or more, and particularly preferably 20% or more, when a load of 1 kg is applied for 5 minutes, because the artificial leather base material or the artificial leather have good stretchability. Note that the average elongation rate when a load of 1 kg is applied for 5 minutes means an average of the elongation rates in a vertical direction corresponding to the direction of the production line and a horizontal direction orthogonal to the vertical direction.

As for the stretchability of the artificial leather base material and an artificial leather using the same, it is preferable that each of the elongation rate in the vertical direction and the elongation rate in the horizontal direction when a load of 1 kg is applied for 5 minutes is 10% or more, from the viewpoint of maintaining less anisotropic stretchability.

Preferably, the artificial leather base material of the present embodiment is an artificial leather base material including: a non-woven fabric that is an entangle body of fibers (A) and fibers (B); and an aqueous polyurethane applied inside the non-woven fabric, wherein the fibers (A) are crimped fibers formed from two types of resins with intrinsic viscosities different from each other and having an average curvature of 15% or more, and are filaments having an average fineness of 0.6 to 2.5 dtex, and the fibers (B) are ultrafine fibers having an average fineness of less than 0.6 dtex, and the artificial leather base material has a content ratio of the aqueous polyurethane of 8 to 15 mass %, and an average void area in a cross section in a thickness direction thereof, of 300 to 1000 $\mu m^2$, because it is possible to obtain an artificial leather base material having good stretchability with an elongation rate and an elongation recovery rate having a certain level or higher even after repeated elongation.

In the non-woven fabric in which the fibers (A) that are crimped fibers and the fibers (B) that are ultrafine fibers having an average fineness of less than 0.6 dtex are entangled, the fibers (B) that are ultrafine fibers have the function of restricting, within a certain elongation range, the elongation of the fibers (A) that are crimped fibers, which tend to cause yarns to be gradually fully elongated when repeatedly elongated and thus be difficult to be restored. However, if the state of entanglement between the fibers (B) and the fibers (A) is insufficient, the function of the fibers (B) that are ultrafine fibers of restricting the movement of the fibers (A) that are crimped fibers within a certain elongation range tends to be reduced. By using the fibers (A) that are crimped fibers having an average curvature of 15% or more, the crimp makes it easy to sufficiently entangle the fibers (A) and the fibers (B). In addition, when the crimped fibers are filaments, the crimped fibers are less likely to fall out, so that the stretchability tends not to be reduced. In addition, the fibers (B) that are ultrafine fibers make the state of the appearance dense, thereby providing a good napped appearance. Furthermore, when the content ratio of the aqueous polyurethane is 8 to 15 mass %, the fibers are moderately restrained without making the artificial leather base material too hard like a rubber, to maintain the stretchability of the artificial leather base material. Also, by sufficiently entangling the fibers (A) and the fibers (B) to adjust the average void area in a cross section in the thickness direction to 300 to 1000 μm² such that the area per void has an appropriate size, it is possible to obtain an artificial leather base material having good stretchability with an elongation rate and an elongation recovery rate having a certain level or higher even after repeated elongation.

The average void area in a cross section in the thickness direction is preferably 300 to 1000 μm², more preferably 350 to 950 μm², and particularly preferably 400 to 900 μm². Here, the average void area in a cross section in the thickness direction is an average area per void in the thickness direction, as calculated in the manner described below. An average void area within such a range allows entanglement to be achieved such that the voids are small even when the artificial leather base material includes the fibers (A) that are crimped fibers having a high average curvature, which tends to be bulky and coarse. When the average void area exceeds 1000 μm², the entanglement of the non-woven fabric that is an entangle body of the fibers (A) and the fibers (B) is insufficient and many voids are present. Accordingly, the ability to maintain the stretchability after repeated elongation tends to be reduced. When the average void area is less than 300 μm², the entanglement of the non-woven fabric that is an entangle body of the fibers (A) and the fibers (B) may be too strong, or the fibers may become difficult to move due to an excessive amount of the aqueous polyurethane. Accordingly, the stretchability tends to be reduced.

The artificial leather base material as described above is excellent in the ability to maintain the stretchability after repeated elongation. Specifically, it is possible to achieve an artificial leather base material having, for example, an average elongation rate of 18% or more and an average elongation recovery rate 55% or more after 20 cycles of repeated elongation, or even an average elongation rate of 20% or more and an average elongation recovery rate of 60% or more after 20 cycles of repeated elongation, as measured in the manner described below.

The apparent density of the artificial leather base material or the artificial leather obtained according to the present embodiment is preferably 0.20 to 0.7 g/cm³, and more preferably 0.25 to 0.5 g/cm³, because it is possible to obtain an artificial leather that is particularly excellent in mechanical properties and high stretchability.

EXAMPLES

Hereinafter, the present invention will be described more specifically by way of examples. It should be appreciated that the scope of the present invention is by no means limited by the examples.

First, the evaluation methods used in the present examples will be described below.

<Average Fineness>

The average fineness was measured as follows. A scanning electron microscope (SEM) photograph of a cross section of the artificial leather base material was taken at a magnification of 3000×. Then, 10 fiber cross sections were randomly selected from the SEM image, the cross-sectional areas thereof were measured, and the average value of the measured cross-sectional areas was calculated. Then, the average value of the cross-sectional areas was converted into an average fineness, using the densities of the resins. Note that the measurements were made separately for the side-by-side polyester fibers in the SEM image as the fibers (A), and the other fibers as the fibers (B).

<Intrinsic Viscosity>

Measurement was carried out by using an Ubbelohde's viscometer (model "HRK-3" manufactured by Hayashi Seisakusho Co., Ltd.), at 30° C. using a solvent mixture of phenol/tetrachloroethane (volume ratio: 1/1) as a solvent.

<Average Curvature>

After slicing a central portion in the thickness direction of the artificial leather base material, the surface on the lower layer side was observed using an electron microscope at a magnification of 100×. Then, as shown in FIG. 1, a distance A from a cord having a length of 100 μm to the curved portion of a fiber 1 where a perpendicular line drawn from the cord intersects with the fiber was measured, and the curvature was calculated by the following formula. Then, the average of the curvatures measured at randomly selected 10 locations was calculated as the average curvature.

$$\text{Average curvature (\%)}=A \text{ (μm)}/100 \text{ (μm)} \times 100$$

<Polyurethane Ratio>

The basis weights of the fibers (A1) and the fibers (B1) that were to be stacked were measured. From the total basis weight W (g/m²) and the respective ratios of the fibers (A) and the fibers (B) therein, the basis weight X (g/m²) of the fibers (A) and the fibers (B) was calculated. Next, where the concentration of an aqueous polyurethane liquid is Y (%) and the pick up when impregnated into the non-woven fabric is Z (%), the ratio of the aqueous polyurethane was determined by the following formula:

$$\text{Aqueous polyurethane ratio (\%)}=[W \times Z/100 \times Y/100]/[W \times Z/100 \times Y/100+X] \times 100$$

<Apparent Density>

The thickness (mm) and the basis weight (g/cm²) were measured in accordance with JIS L 1913, and the apparent density (g/cm³) was calculated from the measured values.

<Elongation Rate and Elongation Recovery Rate>

The elongation rate indicates an elongation percentage when elongation is performed under a constant load. The elongation recovery rate indicates a recovery rate when elongation is performed under a constant load, and thereafter the load is removed. The artificial leather base material was cut out into a width of 2.5 cm, and reference lines were drawn between 5 cm-long portions at an interval of 3 cm. The length L1 by which the reference line was elongated after application of a load of 1 kg for 5 minutes was measured, and the elongation rate was measured by the following formula:

$$\text{Elongation rate (\%)}=[L1 \text{ (cm)}-3 \text{ (cm)}]/3 \text{ (cm)} \times 100$$

In addition, five minutes after releasing the load, the length L2 between the reference lines was measured, and the elongation recovery rate was determined by the following formula:

$$\text{Elongation recovery rate (\%)}=[L1 \text{ (cm)}-L2 \text{ (cm)}]/[L1 \text{ (cm)}-3 \text{ (cm)}] \times 100$$

<Napped Feel>

The appearance of the obtained napped artificial leather was evaluated by visual and tactile observations according to the following criteria:

A: Napped surface with a soft, smooth touch, with fibers having a uniform length finely spread.

B: Napped feel with a coarse touch and no writing effect, with fibers having a nonuniform length coarsely spread.

<Texture>

The obtained napped artificial leather was bent, and the resilience and the touch of flexibility were evaluated according to the following criteria:

A: Texture had fullness, caused no sharp bending, and was excellent in flexibility.

B: Texture corresponding to one or more of the following: lacked fullness; caused sharp bending; hard.

<Stretchiness>

The obtained napped artificial leather was pulled, and the degree of force applied at that time and the feel of recoverability were evaluated according to the following criteria:

A: Easy to be elongated with weak force, and exhibits quick recovery of elongation after releasing the force.

B: Difficult to be elongated with weak force, and exhibits slow recovery of elongation after releasing the force; easy to be elongated with weak force, but exhibits slow recovery of elongation after releasing the force; or difficult to be elongated with weak force, and exhibits quick recovery of elongation after releasing the force.

<Tear Strength>

Test pieces each having a length of 10 cm and a width of 4 cm were cut out from the artificial leather. Then, at the center of the short side of each test piece, a 5 cm-cut was formed parallel to the longer side. Then, using a tensile tester, each of the cut pieces was pinched by the chuck of the jig, and the s-s curve was measured at a tensile speed of 10 cm/min. Measurement was carried out for three test pieces in each of the longitudinal direction of the non-woven raw fabric and a transverse direction perpendicular to the longitudinal direction, and the average value was obtained for each of the directions.

Example 1

Using a polybutylene terephthalate (PBT) having an intrinsic viscosity [η]=1.025 (dl/g) and a polyethylene terephthalate (PET) having an intrinsic viscosity [η]=0.585 (dl/g), these resins were discharged from a multicomponent fiber melt-spinning spinneret at 275° C., and the ejector pressure was adjusted such that the spinning rate was 4000 m/min, and the resulting filaments were collected on a net, to obtain a first fiber web including side-by-side polyester fibers having an average fineness of 1.5 dtex.

Meanwhile, a water-soluble polyvinyl alcohol resin (PVA: sea component) and an isophthalic acid-modified polyethylene terephthalate (island component) having a degree of modification of 6 mol % were discharged from a multicomponent fiber melt-spinning spinneret (number of islands: 12/fiber) at 260° C. such that the sea component/the island component was 50/50 (mass ratio), and were spun at a spinning rate of 800 m/min. Next, the resulting fibers were drawn, to give fibers having an average fineness of 7.7 dtex, and subsequently were crimped. The resulting crimped fibers were cut into 51 mm, and were passed through a carding machine, to obtain a second fiber web.

Next, the obtained webs were stacked at a weight ratio of second fiber web/first fiber web/second fiber web=1/2/1, to form a stacked web. Then, the stacked web was needle-punched using 1-barb needles at a punching density of 1840 P/cm$^2$, thereby forming an entangled fiber sheet having a basis weight of 220 g/m$^2$.

Next, the entangled fiber sheet was subjected to a steam treatment at 110° C. and 23.5% RH. Then, the entangled fiber sheet was dried in an oven at 90 to 110° C., and subsequently was further hot-pressed at 115° C., thereby obtaining a heat-shrunk fiber sheet that had been subjected to a heat shrinking treatment, and had a basis weight of 312 g/m$^2$, an apparent density of 0.52 g/cm$^3$, and a thickness of 0.60 mm.

Next, the heat-shrunk fiber sheet was impregnated with an emulsion (solid content 18%) of an aqueous polyurethane at a pick up of 50%. Note that the aqueous polyurethane was a polycarbonate-based non-yellowing polyurethane. To the emulsion were further added 4.9 parts by mass of a carbodiimide-based crosslinking agent and 6.4 parts by mass of ammonium sulfate per 100 parts by mass of the polyurethane, to adjust the solid content of the polyurethane to 10 mass %. Then, the heat-shrunk fiber sheet that had been impregnated with the emulsion was dried under an atmosphere of 115° C. and 25% RH, and further dried at 150° C.

Then, the heat-shrunk fiber sheet to which the polyurethane had been applied was immersed in hot water at 95° C. for 10 minutes, while being subjected to nipping and high-pressure water jetting, to remove PVA by dissolution, thus forming PET ultrafine fibers having an average fineness of 0.3 dtex. Then, the resulting sheet was dried, to obtain an artificial leather base material.

Then, both surfaces of the artificial leather base material were ground, using a paper with a grid number of 120 for the back surface, and papers with grid numbers of 240 and 320 for the main surface, thus finishing the artificial leather base material into an artificial leather base material with a napped surface formed thereon. Then, using a disperse dye, the artificial leather base material with a napped surface formed thereon was subjected to high-pressure dyeing at 120° C., to obtain a napped artificial leather having a suede-like napped surface. The obtained napped artificial leather had a basis weight of 240 g/m$^2$, an apparent density of 0.282 g/cm$^3$, and a thickness of 0.85 mm.

Then, various properties of the napped artificial leather were evaluated according to the above-described evaluation methods. The results of the foregoing are shown in Table 1 below.

TABLE 1

| | | | Example No. | | | | |
| --- | --- | --- | --- | --- | --- | --- | --- |
| | | | 1 | 2 | 3 | 4 | 5 |
| Fibers (A) | Fineness | dtex | 1.5 | 1.5 | 1.5 | 1.5 | 1.5 |
| | Fiber length | | Filament | Filament | Filament | Filament | Filament |
| | Resin I | Resin type | PBT | PET | PBT | PBT | PBT |
| | | Viscosity (dl/g) | 1.025 | 0.775 | 1.025 | 1.025 | 1.025 |
| | Resin II | Resin type | PET | PET | PET | PET | PET |
| | | Viscosity (dl/g) | 0.585 | 0.52 | 0.52 | 0.585 | 0.52 |
| | Viscosity difference | (dl/g) | 0.44 | 0.255 | 0.505 | 0.44 | 0.505 |

TABLE 1-continued

|  |  |  |  |  |  |  |  |
|---|---|---|---|---|---|---|---|
|  | Ratio of Resin I/II |  | 50/50 | 50/50 | 50/50 | 50/50 | 50/50 |
|  | Curvature | (%) | 16.7 | 25.7 | 20.3 | 15.5 | 14.7 |
| Fibers (B) | Fineness | (dtex) | 0.3 | 0.3 | 0.3 | 0.5 | 0.3 |
|  | Fiber length |  | Staple | Staple | Staple | Staple | Filament |
| (A)/(B) |  |  | 67/33 | 67/33 | 67/33 | 67/33 | 67/33 |
| Number of needle punches |  | (P/cm²) | 1840 | 1840 | 1840 | 1840 | 1840 |
| Content ratio of aqueous polyurethane |  | (mass %) | 10 | 10 | 12 | 11 | 11 |
| Apparent density |  | (g/cm³) | 0.282 | 0.370 | 0.238 | 0.290 | 0.327 |
| Elongation rate | Vertical | (%) | 16.3 | 33.7 | 12.3 | 15.7 | 10.9 |
|  | Horizontal | (%) | 23.3 | 63.8 | 29.2 | 21.0 | 17.0 |
|  | Average (%) |  | 19.8 | 48.8 | 20.8 | 18.4 | 14.0 |
| Elongation recovery rate | Vertical | (%) | 65.7 | 62.6 | 91.3 | 67.0 | 81.0 |
|  | Horizontal | (%) | 66.0 | 65.2 | 81.2 | 66.5 | 84.1 |
| Napped feel |  |  | A | A | A | A | A |
| Texture |  |  | A | A | A | A | A |
| Tear strength | Vertical | (kg) | 3.5 | 5.3 | 3.2 | 4.0 | 5.4 |
|  | Horizontal | (kg) | 4.5 | 3.5 | 3.1 | 4.2 | 6.8 |

| | | | Example No. | | | | |
|---|---|---|---|---|---|---|---|
| | | | 6 | Com Ex. 1 | Com Ex. 2 | Com Ex. 3 | Com Ex. 4 |
| Fibers (A) | Fineness | dtex | 0.6 | 1.4 | 1.4 | 1.32 | 1.5 |
|  | Fiber length |  | Filament | Filament | Filament | Filament | Filament |
|  | Resin I | Resin type | PBT | PBT | PBT | — | PBT |
|  |  | Viscosity (dl/g) | 1.025 | 1.025 | 1.025 | — | 1.025 |
|  | Resin II | Resin type | PET | PET | PET | PET | PET |
|  |  | Viscosity (dl/g) | 0.52 | 0.52 | 0.52 | 0.615 | 0.585 |
|  | Viscosity difference | (dl/g) | 0.505 | 0.505 | 0.505 | — | 0.44 |
|  | Ratio of Resin I/II |  | 50/50 | 50/50 | 50/50 | 0/100 | 50/50 |
|  | Curvature | (%) | 14.5 | 18.3 | 9.4 | 4.2 | 14.7 |
| Fibers (B) | Fineness | (dtex) | 0.3 | — | — | — | 0.6 |
|  | Fiber length |  | Staple | — | — | — | Staple |
| (A)/(B) |  |  | 67/33 | 100/0 | 100/0 | 100/0 | 67/33 |
| Number of needle punches |  | (P/cm²) | 1840 | 1840 | 2760 | 3680 | 1840 |
| Content ratio of aqueous polyurethane |  | (mass %) | 11 | 6 | 6 | 6 | 11 |
| Apparent density |  | (g/cm³) | 0.290 | 0.163 | 0.284 | 0.387 | 0.283 |
| Elongation rate | Vertical | (%) | 16.0 | 12.3 | 1.9 | 4.5 | 16.1 |
|  | Horizontal | (%) | 21.0 | 27.5 | 4.8 | 5.4 | 22.0 |
|  | Average (%) |  | 18.5 | 19.9 | 3.4 | 5.0 | 19.1 |
| Elongation recovery rate | Vertical | (%) | 85.2 | 65.6 | 77.2 | 64.9 | 67.2 |
|  | Horizontal | (%) | 84.8 | 62.4 | 76.2 | 59.0 | 67.3 |
| Napped feel |  |  | A | B | B | B | B |
| Texture |  |  | A | A | B | B | A |
| Tear strength | Vertical | (kg) | 4.0 | 2.0 | 7.4 | 6.6 | 3.8 |
|  | Horizontal | (kg) | 3.8 | 1.7 | 8.2 | 7.5 | 4.3 |

Example 2

As shown in Table 1, a napped artificial leather was obtained in the same manner as in Example 1 except for using PET having an intrinsic viscosity [η]=0.775 (dl/g) in place of PBT having an intrinsic viscosity [η]=1.025 (dl/g), and using a PET having an intrinsic viscosity [η]=0.52 (dl/g) in place of PET having an intrinsic viscosity [η]=0.585 (dl/g) and evaluated. The results are shown in Table 1.

Example 3

As shown in Table 1, a napped artificial leather was obtained in the same manner as in Example 1 except for using PET having an intrinsic viscosity [η]=0.52 (dl/g) in place of PET having an intrinsic viscosity [η]=0.585 (dl/g), and further changing the content ratio of the aqueous polyurethane and evaluated. The results are shown in Table 1.

Example 4

As shown in Table 1, a napped artificial leather was obtained in the same manner as in Example 1 except for forming PET ultrafine fibers having an average fineness of 0.5 dtex instead of forming the PET ultrafine fibers having an average fineness of 0.3 dtex, and further changing the content ratio of the aqueous polyurethane and evaluated. The results are shown in Table 1.

Example 5

A napped artificial leather was obtained in the same manner as in Example 3 except for changing the second fiber web of Example 3 to a second fiber web produced in the following manner, thus changing the ultrafine fibers to ultrafine fibers of filaments as shown in Table 1 and evaluated. The results are shown in Table 1.
(Production of Second Fiber Web)

A water-soluble thermoplastic polyvinyl alcohol-based resin (PVA; sea component) and an isophthalic acid-modified polyethylene terephthalate (island component) having a degree of modification of 6 mol % were discharged from a multicomponent fiber melt-spinning spinneret (number of islands: 12/fiber) at 260° C. such that the sea component/the island component was 25/25 (mass ratio). Then, the ejector pressure was adjusted such that the spinning rate was 3500 m/min, and the resulting filaments were collected on a net, to obtain a second fiber web including island-in-the-sea conjugated fibers of filaments having an average fineness of 3.0 dtex.

Example 6

As shown in Table 1, a napped artificial leather was obtained in the same manner as in Example 3 except for using a first fiber web including side-by-side polyester fibers having an average fineness of 0.6 dtex in place of the first fiber web including side-by-side polyester fibers having an average fineness of 1.5 dtex and evaluated. The results are shown in Table 1.

Comparative Example 1

As shown in Table 1, a napped artificial leather was obtained in the same manner as in Example 2 except for using PBT having an intrinsic viscosity [η]=1.025 (dl/g) in place of PET having an intrinsic viscosity [η]=0.775 (dl/g), instead of forming the stacked web by stacking the first web and the second web at a weight ratio of second fiber web/first fiber web/second fiber web=1/2/1, forming a stacked web having the same basis weight only with the first fiber web, and further changing the content ratio of the aqueous polyurethane and evaluated. The results are shown in Table 1.

Comparative Example 2

As shown in Table 1, a napped artificial leather was obtained in the same manner as in Comparative Example 1 except for making changes such as needle punching the stacked web at 2760 punches/cm$^2$ instead of needle punching the stacked web at 1840 punches/cm$^2$ and evaluated. The results are shown in Table 1.

Comparative Example 3

As shown in Table 1, a napped artificial leather was obtained in the same manner as in Example 1 except for using a first fiber web including polyester fibers made from PET having an intrinsic viscosity [η]=0.615 (dl/g) in place of the first fiber web including side-by-side polyester fibers having an average fineness of 1.5 dtex, needle punching the stacked web at 3680 punches/cm$^2$ instead of needle punching the stacked web at 1840 punches/cm$^2$, and further changing the content ratio of the aqueous polyurethane and evaluated. The results are shown in Table 1.

Comparative Example 4

As shown in Table 1, a napped artificial leather was obtained in the same manner as in Example 1 except for forming PET fibers having an average fineness of 0.6 dtex instead of forming PET ultrafine fibers having an average fineness of 0.3 dtex and evaluated. The results are shown in Table 1.

Referring to Table 1, each of the napped artificial leather obtained in Examples 1 to 6 according to the present invention exhibited stretchability with an elongation rate of 10% or more in both the vertical direction and the horizontal direction, and an average elongation rate of 10% or more, also exhibited a tear strength of 3 kg or more in both the vertical direction and the horizontal direction, and also had a good napped feel. On the other hand, the napped artificial leather of Comparative Example 1, which did not include the fibers (B) that are ultrafine fibers having an average fineness of less than 0.6 dtex, exhibited an elongation rate of 10% or more in both the vertical direction and the horizontal direction, and an average elongation rate of 10% or more, but exhibited a low tear strength. Also, the napped artificial leather obtained in Comparative Example 2, for which the degree of entanglement was increased by increasing the punching density in order to enhance the tear strength, based on the napped artificial leather obtained in Comparative Example 1, exhibited an increased tear strength, but a reduced stretchability. In addition, the napped artificial leather obtained in Comparative Example 4, for which the fineness of the fibers (B) was increased relative to Example 1, had a poor napped feel.

Example 7

Using a polybutylene terephthalate (PBT) having an intrinsic viscosity [η]=1.025 (dl/g) and a polyethylene terephthalate (PET) having an intrinsic viscosity [η]=0.52 (dl/g) at a ratio of 50/50, these resins were discharged at a discharge rate A of 0.25 (g/min) from a multicomponent fiber melt-spinning spinneret having an area per hole of 0.08 mm$^2$ at 275° C. Note that, at this time, the melt density B of the resins was 1.21 (g/cm$^3$). Then, the ejector pressure was adjusted such that the spinning rate D was 3987 m/min, then spinning was performed such that the spinning draft was 1544, and the resulting filaments were collected on a net, to obtain a first fiber web including side-by-side polyester fibers having an average fineness of 0.63 dtex.

Meanwhile, a water-soluble polyvinyl alcohol resin (PVA: sea component) and an isophthalic acid-modified polyethylene terephthalate (island component) having a degree of modification of 6 mol % were discharged from a multicomponent fiber melt-spinning spinneret (number of islands: 12/fiber) at 260° C. such that the sea component/the island component was 50/50 (mass ratio), and were spun at a spinning rate of 800 m/min. Next, the resulting fibers were drawn, to give fibers having an average fineness of 7.7 dtex, and subsequently were crimped. The resulting crimped fibers were cut into 51 mm, and were passed through a carding machine, to obtain a second fiber web.

Next, the obtained webs were stacked at a mass ratio of second fiber web/first fiber web/second fiber web=1/2/1, to form a stacked web. Then, the stacked web was needle-punched using 1-barb needles at a punching density of 1840 P/cm$^2$, thereby forming an entangled fiber sheet having a basis weight of 410 g/m$^2$.

Next, the entangled fiber sheet was subjected to a steam treatment at 110° C. and 23.5% RH. Then, the entangled fiber sheet was dried in an oven at 90 to 110° C., and subsequently was further hot-pressed at 115° C., thereby obtaining a heat-shrunk fiber sheet that had been subjected to a heat shrinking treatment, and had a basis weight of 511 g/m$^2$, an apparent density of 0.63 g/cm$^3$, and a thickness of 0.81 mm.

Next, the heat-shrunk fiber sheet was impregnated with an emulsion (solid content 10%) of an aqueous polyurethane at a pick up of 50%. The aqueous polyurethane was a polycarbonate-based non-yellowing polyurethane. With the emulsion used, 1.5 parts by mass of a carbodiimide-based crosslinking agent and 7.5 parts by mass of ammonium sulfate per 100 parts by mass of the aqueous polyurethane were added, to adjust the solid content of the polyurethane to 10 mass %. Then, the heat-shrunk fiber sheet that had been impregnated with the emulsion was dried under an atmosphere of 115° C. and 25% RH, and further dried at 150° C.

Then, the heat-shrunk fiber sheet to which the polyurethane had been applied was immersed in hot water at 95° C. for 10 minutes, while being subjected to nipping and high-pressure water jetting to remove PVA by dissolution, thus forming PET ultrafine fibers having an average fineness of 0.3 dtex. Then, the resulting sheet was dried, to obtain an artificial leather base material.

Then, both surfaces of the artificial leather base material were ground, using a paper with a grid number of 120 for the back surface, and papers with grid numbers of 240 and 320 for the main surface, thus finishing the artificial leather base material into an artificial leather base material with a napped surface formed thereon. Then, using a disperse dye, the artificial leather base material with a napped surface formed thereon was subjected to high-pressure dyeing at 120° C., to obtain a napped artificial leather having a suede-like napped surface. The obtained napped artificial leather had a basis weight of 352 g/m$^2$, an apparent density of 0.314 g/cm$^3$, and a thickness of 1.12 mm. In addition, the polyurethane content ratio was 10 mass %.

Then, various properties of the napped artificial leather were evaluated according to the above-described evaluation methods. Note that "Spinning draft of crimped-type fibers (A1)" was calculated as follows.

<Spinning Draft of Crimped-Type Fibers (A1)>

The spinning draft was calculated by the following formula:

$$\text{Spinning draft} = D/(A/B/C \times 10^4)$$

where A (g/min) is the discharge rate of the polymer discharged from one hole of the spinning nozzle during melt spinning of the crimped-type fibers (A1), B (g/cm$^3$) is the melt density of the polymer, C (mm$^2$) is the area per hole, and D (m/min) is the spinning rate.

Note that the discharge volumes (cc/rpm) of the two types of resins with different intrinsic viscosities respectively discharged during melt spinning were represented as E1 and E2, and the numbers of revolutions (rpm) of the gear pumps when discharging the resins were represented as F1 and F2, respectively, and the polymer discharge amounts per minute (g/min) G1 and G2 were measured. Then, the resin melt density B (g/cm$^3$) was calculated by the following formula:

$$\text{Melt density (g/cm}^3\text{)} = G1/E1/F1 \times G1/(G1+G2) + G2/E2/F2 \times G2/(G1+G2)$$

In addition, "Average void area in cross section in thickness direction" was evaluated as follows.

<Average Void Area in Cross Section in Thickness Direction>

The average void area in a cross section in a thickness direction was measured as follows.

Figure 2:
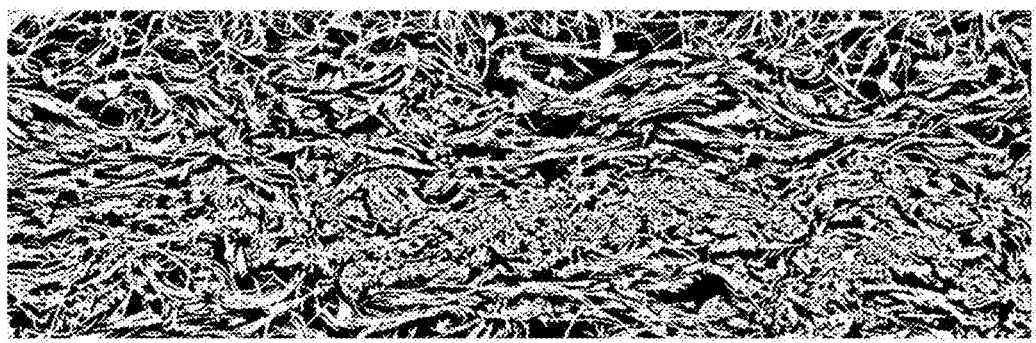
FIG. 2 is an explanatory diagram illustrating an average void area in a cross section in a thickness direction.

All layers of the artificial leather base material in a cross section in the thickness direction thereof were observed using a scanning electron microscope at a magnification of 40×, and images of the layers were taken. Then, the obtained images were binarized by dynamic thresholding, using image analysis software Popimaging (manufactured by Digital being kids. Co.). Then, the binarized images were read with an Image-Pro Premier (manufactured by Nippon Roper Co Ltd.), and the void portions having an area of 5 dots or more were extracted using a count tool. The measurement was carried out at three evenly selected cross sections. Then, the areas of the extracted void portions were measured using a measurement tool, and the average value was determined. FIG. 2 shows an example of the images obtained in Example 1. Each of the black portions corresponds to the void portion.

In addition, for "Elongation rate and elongation recovery rate", "Texture" and "Stretchiness", the results obtained at the first cycle and the 20th cycle, respectively, when the operation described in "Elongation rate and elongation recovery rate" was repeated were acquired.

The results of the foregoing are shown in Table 2 below.

TABLE 2

| | | | Example No. | | | | | | | |
|---|---|---|---|---|---|---|---|---|---|---|
| | | | 7 | 8 | 9 | 10 | 11 | 12 | 12 | 14 |
| Fibers (A) | Fineness | dtex | 0.63 | 1.18 | 2.42 | 0.63 | 0.63 | 0.63 | 1.18 | 1.18 |
| | Fiber length | | Filament | Filament | Filament | Filament | Filament | Filament | Filament | Filament |
| | Resin I | Resin type | PBT | PBT | PBT | PBT | PBT | PBT | PBT | PBT |
| | | Viscosity (dl/g) | 1.025 | 1.025 | 1.025 | 1.025 | 1.025 | 1.025 | 1.025 | 1.025 |
| | Resin II | Resin type | PET | PET | PET | PET | PET | PET | PET | PET |
| | | Viscosity (dl/g) | 0.52 | 0.52 | 0.52 | 0.52 | 0.52 | 0.52 | 0.52 | 0.52 |
| | Viscosity difference | (dl/g) | 0.505 | 0.505 | 0.505 | 0.505 | 0.505 | 0.505 | 0.505 | 0.505 |
| | Ratio of Resin I/II | | 50/50 | 50/50 | 50/50 | 50/50 | 50/50 | 50/50 | 50/50 | 50/50 |
| | Spinning draft | | 1544 | 768 | 400 | 1544 | 1544 | 1544 | 768 | 768 |
| | Curvature | (%) | 26.7 | 22.1 | 15.9 | 24.0 | 26.7 | 38.0 | 18.5 | 21.3 |
| Fibers (B) | Fineness | (dtex) | 0.3 | 0.3 | 0.3 | 0.5 | 0.3 | 0.3 | 0.3 | 0.3 |
| | Fiber length | | Staple | Staple | Staple | Staple | Staple | Staple | Staple | Staple |
| | Curvature | (%) | 9.5 | 10 | 9.0 | 10.5 | 9.0 | 13.1 | 11.0 | 13.1 |
| Fibers (A)/Fibers (B) | | | 68/32 | 68/32 | 68/32 | 68/32 | 81/19 | 42/58 | 68/32 | 68/32 |
| Number of needle punches(P/cm$^2$) | | | 1840 | 1840 | 1840 | 1840 | 1840 | 1840 | 1840 | 1840 |
| Content ratio of aqueous polyurethane | | (%) | 10 | 10 | 10 | 10 | 10 | 10 | 8.5 | 13 |
| Apparent density | | (g/cm$^3$) | 0.314 | 0.313 | 0.331 | 0.320 | 0.267 | 0.286 | 0.269 | 0.336 |
| Average void area | | (μm$^2$) | 615.4 | 900.0 | 756.4 | 610.5 | 864.0 | 728.2 | 668.5 | 585.0 |
| Elongation rate | Vertical | (%) | 7.8 | 18.3 | 10.2 | 8.3 | 11.4 | 12.6 | 20.3 | 8.7 |
| | Horizontal | (%) | 16.1 | 24.3 | 14.1 | 18.2 | 27.3 | 24.9 | 34.3 | 23.1 |
| | Average | (%) | 12.0 | 21.3 | 12.2 | 13.3 | 19.4 | 18.8 | 27.3 | 15.9 |
| Elongation recovery rate | Vertical | (%) | 89.3 | 78.8 | 80.8 | 88.2 | 90.3 | 79.8 | 72.9 | 95.4 |
| | Horizontal | (%) | 88.6 | 76.7 | 64.0 | 87.1 | 81 | 67.9 | 66.5 | 78.9 |
| | Average | (%) | 89.0 | 77.8 | 72.4 | 87.7 | 85.7 | 73.9 | 69.7 | 87.2 |
| Elongation rate at 20th cycle of repeated elongation | Vertical | (%) | 14.0 | 21.1 | 17.1 | 14.5 | 16.3 | 17.0 | 23.5 | 12.5 |
| | Horizontal | (%) | 23.3 | 30.6 | 21.6 | 22 | 34.4 | 30.9 | 44.7 | 29.5 |
| | Average | (%) | 18.7 | 25.9 | 19.4 | 18.3 | 25.4 | 24.0 | 34.1 | 21.0 |
| Elongation recovery rate at 20th cycle of repeated elongation | Vertical | (%) | 65.8 | 67.6 | 58.7 | 66.0 | 71.3 | 66.1 | 56.2 | 80.0 |
| | Horizontal | (%) | 68.3 | 57.1 | 60.1 | 67.5 | 58.3 | 47.0 | 54.0 | 67.3 |
| | Average | (%) | 67.1 | 62.4 | 59.4 | 66.8 | 64.8 | 56.5 | 55.1 | 73.7 |
| Texture | | | A | A | A | A | A | A | A | A |
| Napped feel | | | A | A | A | A | A | A | A | A |
| Stretchiness | | | A | A | A | A | A | A | A | A |
| Texture after 20 cycles of repeated elongation | | | A | A | A | A | A | A | A | A |
| Stretchiness after 20 cycles of repeated elongation | | | A | A | A | A | A | A | A | A |
| Tear strength | Vertical | (kg) | 7.3 | 4.4 | 7.4 | 6.9 | 2.7 | 5.6 | 4.3 | 6.7 |
| | Horizontal | (kg) | 4.6 | 6.5 | 8.5 | 5.5 | 3.0 | 4.2 | 4.5 | 5.1 |

Example 8

A napped artificial leather was obtained in the same manner as in Example 7 except for using a first fiber web produced as follows and evaluated.

Using a polybutylene terephthalate (PBT) having an intrinsic viscosity [η]=1.025 (dl/g) and a polyethylene terephthalate (PET) having an intrinsic viscosity [η]=0.52 (dl/g) at a ratio of 50/50, these resins were discharged at a discharge rate A of 0.51 (g/min) from a multicomponent fiber melt-spinning spinneret having an area per hole C of 0.08 mm$^2$ at 275° C. Then, the ejector pressure was adjusted such that the spinning rate D was 4048 m/min, then spinning was performed such that the spinning draft was 768, and the resulting filaments were collected on a net, to obtain a first fiber web including side-by-side polyester fibers having an average fineness of 1.18 dtex.

The results are shown in Table 2.

Example 9

A napped artificial leather was obtained in the same manner as in Example 7 except for using a first fiber web produced as follows and evaluated.

Using a polybutylene terephthalate (PBT) having an intrinsic viscosity [η]=1.025 (dl/g) and a polyethylene terephthalate (PET) having an intrinsic viscosity [η]=0.52 (dl/g) at a ratio of 50/50, these resins were discharged at a discharge rate A of 1.0 (g/min) from a multicomponent fiber melt-spinning spinneret having area per hole C of 0.08 mm$^2$ at 275° C. Then, the ejector pressure was adjusted such that the spinning rate D was 4132 m/min, then spinning was performed such that the spinning draft was 400, and the resulting filaments were collected on a net, to obtain a first fiber web including side-by-side polyester fibers having an average fineness of 2.42 dtex.

The results are shown in Table 2.

Example 10

A napped artificial leather was obtained in the same manner as in Example 7 except for using a second fiber web produced as follows, and forming PET ultrafine fibers having an average fineness of 0.5 dtex instead of forming PET ultrafine fibers having an average fineness of 0.3 dtex and evaluated.

A water-soluble polyvinyl alcohol resin (PVA: sea component) and an isophthalic acid-modified polyethylene terephthalate (island component) having a degree of modification of 6 mol % were discharged from a multicomponent fiber melt-spinning spinneret (number of islands: 12/fiber) at 260° C. such that the sea component/the island component was 50/50 (mass ratio), and were spun at a spinning rate of 800 m/min. Next, the resulting fibers were drawn, to give fibers having an average fineness of 11.8 dtex, and subsequently were crimped. The resulting crimped fibers were cut into 51 mm, and were passed through a carding machine, to obtain a second fiber web.

The results are shown in Table 2.

Example 11

A napped artificial leather was obtained in the same manner as in Example 7 except that, instead of stacking the webs at a mass ratio of second fiber web/first fiber web/second fiber web=1/2/1, to form a stacked web, the webs were stacked at a mass ratio of 1/8.5/1, to obtain a stacked web and evaluated. The results are shown in Table 2.

Example 12

A napped artificial leather was obtained in the same manner as in Example 7 except that, instead of stacking the webs at a mass ratio of second fiber web/first fiber web/second fiber web=1/2/1, to form a stacked web, the webs were stacked at a mass ratio of 0.7/1/0.7, to obtain a stacked web and evaluated. The results are shown in Table 2.

Example 13

A napped artificial leather was obtained in the same manner as in Example 8 except that, instead of impregnating the heat-shrunk fiber sheet with an emulsion (solid content 10%) of an aqueous polyurethane at a pick up of 50%, the heat-shrunk fiber sheet was impregnated with an emulsion (solid content 11%) of an aqueous polyurethane at a pick up of 50%, to change the polyurethane content ratio to 8.5 mass % in place of 10 mass % and evaluated. The results are shown in Table 2.

Example 14

A napped artificial leather was obtained in the same manner as in Example 8 except that, instead of impregnating the heat-shrunk fiber sheet with an emulsion (solid content 10%) of an aqueous polyurethane at a pick up of 50%, the heat-shrunk fiber sheet was impregnated with an emulsion (solid content 18.8%) of an aqueous polyurethane at a pick up of 50%, to change the polyurethane content ratio to 13 mass % in place of 10 mass % and evaluated. The results are shown in Table 2.

Example 15

A napped artificial leather was obtained and evaluated in the same manner as in Example 13 except for using a first fiber web produced as follows.

Using a polybutylene terephthalate (PBT) having an intrinsic viscosity $[\eta]=1.025$ (dl/g) and a polyethylene terephthalate (PET) having an intrinsic viscosity $[\eta]=0.52$ (dl/g) at a ratio of 50/50, these resins were discharged at a discharge rate A of 1.0 (g/min) from a multicomponent fiber melt-spinning spinneret having an area per hole C of 0.08 $mm^2$ at 275° C. Then, the ejector pressure was adjusted such that the spinning rate D was 4065 m/min, then spinning was performed such that the spinning draft was 393, and the resulting filaments were collected on a net, to obtain a first fiber web including side-by-side polyester fibers having an average fineness of 2.46 dtex.

The results are shown in Table 3 below.

TABLE 3

| | | | \multicolumn{6}{c|}{Example No.} |
|---|---|---|---|---|---|---|---|---|
| | | | 15 | Com Ex.5 | Com Ex. 6 | 16 | 17 | 18 |
| Fibers (A) | Fineness | dtex | 2.46 | 1.4 | 1.32 | 1.18 | 1.18 | 1.18 |
| | Fiber length | | Filament | Filament | Filament | Filament | Filament | Filament |
| | Resin I | Resin type | PBT | PBT | — | PBT | PBT | PBT |
| | | Viscosity (dl/g) | 1.025 | 1.025 | — | 1.025 | 1.025 | 1.025 |
| | Resin II | Resin type | PET | PET | PET | PET | PET | PET |
| | | Viscosity (dl/g) | 0.52 | 0.52 | 0.615 | 0.52 | 0.52 | 0.52 |
| | Viscosity difference | (dl/g) | 0.505 | 0.505 | — | 0.505 | 0.505 | 0.505 |
| | Ratio of Resin I/II | | 50/50 | 50/50 | 0/100 | 50/50 | 50/50 | 50/50 |
| | Spinning draft | | 393 | 691 | 733 | 768 | 768 | 768 |
| | Curvature | (%) | 13.1 | 18.3 | 4.2 | 18.2 | 18.5 | 20.3 |
| Fibers (B) | Fineness | (dtex) | 0.3 | — | — | 0.3 | 0.3 | 0.3 |
| | Fiber length | | Staple | — | — | Staple | Staple | Staple |
| | Curvature | (%) | 12.3 | — | — | 7.7 | 10.0 | 10.0 |
| (A)/(B) | | | 68/32 | 100/0 | 100/0 | 68/32 | 68/32 | 68/32 |
| Number of needle punches | | (P/cm²) | 1840 | 1840 | 3680 | 1840 | 1840 | 1840 |
| Content ratio of aqueous polyurethane | | (%) | 10 | 6 | 6 | 5 | 7.5 | 16 |
| Apparent density | | (g/cm³) | 0.33 | 0.163 | 0.387 | 0.221 | 0.269 | 0.356 |
| Average void area | | (μm²) | 1011.4 | 1332.8 | 839.8 | 898.9 | 668.5 | 478.5 |

TABLE 3-continued

| | | | 15 | Com Ex.5 | Com Ex. 6 | 16 | 17 | 18 |
|---|---|---|---|---|---|---|---|---|
| Elongation rate | Vertical | (%) | 9.9 | 12.3 | 4.5 | 21.1 | 20.3 | 5.5 |
| | Horizontal | (%) | 17.6 | 27.5 | 5.4 | 38.1 | 34.3 | 17.3 |
| | Average | (%) | 13.8 | 19.9 | 5.0 | 29.6 | 27.3 | 11.4 |
| Elongation | Vertical | (%) | 67.6 | 65.6 | 64.9 | 72.8 | 72.9 | 93.9 |
| recovery rate | Horizontal | (%) | 56.4 | 62.4 | 59.0 | 52.5 | 66.5 | 80.9 |
| | Average | (%) | 62.0 | 64.0 | 62.0 | 62.7 | 69.7 | 87.4 |
| Elongation rate at 20th cycle of | Vertical | (%) | 15.1 | 54.6 | 8.1 | 26.2 | 23.5 | 7.2 |
| repeated | Horizontal | (%) | 23.4 | 53.8 | 7.2 | 55.2 | 44.7 | 20.7 |
| elongation | Average | (%) | 19.3 | 54.2 | 7.7 | 40.7 | 34.1 | 14.0 |
| Elongation | Vertical | (%) | 50.4 | 37.3 | 38.8 | 46.8 | 53.2 | 81.1 |
| recovery rate at | Horizontal | (%) | 51.9 | 38.1 | 48.1 | 37.0 | 52.0 | 70.0 |
| 20th cycle of repeated elongation | Average | (%) | 51.2 | 37.7 | 43.5 | 41.9 | 52.6 | 75.6 |
| Texture | | | A | A | B | A | A | A |
| Napped feel | | | A | B | B | A | A | A |
| Stretchiness | | | A | A | B | B | B | B |
| Texture after 20 cycles of repeated elongation | | | A | A | B | A | A | A |
| Stretchiness after 20 cycles of repeated elongation | | | B | B | B | B | B | B |
| Tear strength | Vertical | (kg) | 9.6 | 2.0 | 6.6 | 3.5 | 4.3 | 5.2 |
| | Horizontal | (kg) | 8.2 | 1.7 | 7.5 | 4.1 | 4.5 | 6.2 |

Comparative Example 5

A napped artificial leather was obtained in the same manner as in Example 7 except for forming a stacked web only with a first fiber web produced as follows, and also changing the aqueous polyurethane content ratio to 6 mass % in place of 10 mass % and evaluated.

Using a polybutylene terephthalate (PBT) having an intrinsic viscosity [η]=1.025 (dl/g) and a polyethylene terephthalate (PET) having an intrinsic viscosity [η]=0.52 (dl/g) at a ratio of 50/50, these resins were discharged at a discharge rate A of 0.51 (g/min) from a multicomponent fiber melt-spinning spinneret having an area per hole C of 0.08 mm² at 275° C. Then, the ejector pressure was adjusted such that the spinning rate D was 3643 m/min, then spinning was performed such that the spinning draft was 691, and the resulting filaments were collected on a net, to obtain a first fiber web including side-by-side polyester fibers having an average fineness of 1.4 dtex.

The results are shown in Table 3.

Comparative Example 6

A napped artificial leather was obtained in the same manner as in Example 7 except for using a first fiber web including regular polyester fibers having an average fineness of 1.32 dtex in place of the first fiber web including side-by-side polyester fibers, forming a stacked web only with the first fiber web, and also changing the content ratio of the aqueous polyurethane to 6 mass % in place of 10 mass % and evaluated. The results are shown in Table 3.

Example 16

A napped artificial leather was obtained in the same manner as in Example 8 except that, instead of impregnating the heat-shrunk fiber sheet with an emulsion (solid content 10%) of an aqueous polyurethane at a pick up of 50%, the heat-shrunk fiber sheet was impregnated with an emulsion (solid content 6.6%) of an aqueous polyurethane at a pick up of 50%, to change the polyurethane content ratio to 5 mass % in place of 10 mass % and evaluated. The results are shown in Table 3.

Example 17

A napped artificial leather was obtained in the same manner as in Example 8 except that, instead of impregnating the heat-shrunk fiber sheet with an emulsion (solid content 10%) of an aqueous polyurethane at a pick up of 50%, the heat-shrunk fiber sheet was impregnated with an emulsion (solid content 10.2%) of an aqueous polyurethane at a pick up of 50%, to change the polyurethane content ratio to 7.5 mass % in place of 10 mass % and evaluated. The results are shown in Table 3.

Example 18

A napped artificial leather was obtained in the same manner as in Example 8 except that, instead of impregnating the heat-shrunk fiber sheet with an emulsion (solid content 10%) of an aqueous polyurethane at a pick up of 50%, the heat-shrunk fiber sheet was impregnated with an emulsion (solid content 24%) of an aqueous polyurethane at a pick up of 50%, to change the polyurethane content ratio to 16 mass % in place of 10 mass % and evaluated. The results are shown in Table 3.

Referring to Table 2, each of the napped artificial leathers obtained in Examples 7 to 14, in which the average void area in a cross section in the thickness direction was 300 to 1000 μm², had highly recoverable stretchability after repeated elongation, and maintained high stretchability even after repeated elongation. On the other hand, referring to Table 3, in the case of the artificial leather of Example 15, which was produced at a spinning draft of 393 and had a somewhat low average curvature of the fibers (A), the average void area in a cross section in the thickness direction exceeded 1000 μm², and the elongation recovery rate after repeated elongation was somewhat low. In the case of Comparative Example 5, in which the stacked web was formed only with the first fiber web, the average void area in a cross section in the thickness direction also exceeded 1000 µm², the elongation recovery rate after repeated elongation was low, and the tear strength was also low. In the case of Comparative Example 6, in which the first fiber web including regular polyester fibers having an average fineness of 1.32 dtex was used in place of the first fiber web including side-by-side polyester fibers, and the stacked web was formed only with the first fiber web, the stretchability was low. In the case of Example 16, in which the content ratio of the polyurethane was 5%, the elongation recovery rate after repeated elongation was low. In the case of Example 17, in which the content ratio of the polyurethane was 7.5%, the elongation recovery rate after repeated elongation was also low. In the case of Example 18, in which the content ratio of the polyurethane was 16%, the elongation rate was low.

REFERENCE SIGNS LIST

1. . . . Fiber

The invention claimed is:

1. An artificial leather base material comprising:
a fiber base material consisting of a non-woven fabric that is an entangle body of fibers (A) and fibers (B); and
an elastic polymer applied inside the non-woven fabric,
wherein the fibers (A) are crimped fibers that are formed from two types of resins with intrinsic viscosities different from each other, and that are filaments having an average fineness of 0.6 dtex or more,
the fibers (B) are ultrafine fibers having an average fineness of less than 0.6 dtex, and
the elastic polymer comprises an aqueous polyurethane, and a content ratio of the aqueous polyurethane is from 8 to 15 mass % in the artificial leather base material.

2. The artificial leather base material according to claim 1, wherein the fibers (A) have an average curvature of 10% or more.

3. The artificial leather base material according to claim 1, wherein the fibers (A) have an average curvature of 15% or more.

4. The artificial leather base material according to claim 3, wherein the fibers (B) have an average curvature of less than 15%.

5. The artificial leather base material according to claim 4, wherein the fibers (B) are staples having an average fiber length of less than 100 mm.

6. The artificial leather base material according to claim 3, wherein the fibers (A) are side-by-side fibers or eccentric sheath-core fibers in which a difference between the intrinsic viscosities of the two types of resins is 0.05 (dl/g) or more.

7. The artificial leather base material according to claim 1, wherein at least one of the two types of resins is selected from the group consisting of a polyethylene terephthalate, a polybutylene terephthalate, a polyester elastomer, a polyamide-based resin, and modified products thereof.

8. The artificial leather base material according to claim 7, wherein a mixing ratio ((A)/(B)) between the fibers (A) and the fibers (B) is 10/90 to 90/10.

9. The artificial leather base material according to claim 8, wherein the artificial leather base material has an average elongation rate of 10% or more when a load of 1 kg is applied thereto for 5 minutes.

10. The artificial leather base material according to claim 1, wherein an average void area in a cross section in a thickness direction of the artificial leather base material is 300 to 1000 µm².

11. A method for producing the artificial leather base material according to claim 1, comprising at least:
preparing a first fiber web including crimped-type fibers (A1) for forming the fibers (A), the crimped-type fibers (A1) being formed from two types of resins with intrinsic viscosities different from each other and being filaments of 0.6 dtex or more;
preparing a second fiber web of ultrafine fiber-generating fibers (B1) for forming the fibers (B);
stacking the second fiber web on at least one side of the first fiber web to form a stacked web;
forming an entangled fiber sheet in which the crimped-type fibers (A1) and the ultrafine fiber-generating fibers (B1) that form the stacked web are entangled;
heat-shrinking the entangled fiber sheet to form a heat-shrunk fiber sheet;
subjecting the ultrafine fiber-generating fibers (B1) that form the heat-shrunk fiber sheet to an ultrafine fiber-generating treatment, thereby forming a non-woven fabric that is an entangle body of the crimped-type fibers (A1) and the fibers (B); and
applying, by impregnation, an elastic polymer to the heat-shrunk fiber sheet or the non-woven fabric to form the artificial leather base material,
wherein the applying the elastic polymer by impregnation comprises impregnating the heat-shrunk fiber sheet or the non-woven fabric with a polyurethane aqueous emulsion, and subsequently drying the polyurethane aqueous emulsion, thereby producing the aqueous polyurethane.

12. The method for producing the artificial leather base material according to claim 11, wherein the stacked web is a stack in which the second fiber web is stacked on both sides of the first fiber web.

13. The method for producing the artificial leather base material according to claim 11, wherein the crimped-type fibers (A1) are crimped-type fibers that have been spun at a spinning draft of 400 or more and that have a fineness of 0.6 dtex or more, and the method produces an artificial leather base material having the content ratio of the aqueous polyurethane and an average void area in a cross section in a thickness direction thereof, of 300 to 1000 µm².

14. An artificial leather base material comprising:
a fiber base material consisting of a non-woven fabric that is an entangle body of fibers (A) and fibers (B); and
an elastic polymer applied inside the non-woven fabric,
wherein the fibers (A) are side-by-side fibers or eccentric sheath-core fibers, formed from two types of resins with intrinsic viscosities different from each other, in which a difference between the intrinsic viscosities of the two types of resins is 0.05 (dl/g) or more, and that are filaments having an average fineness of 0.6 dtex or more,
the fibers (B) are ultrafine fibers having an average fineness of less than 0.6 dtex, and that are staples having an average fiber length of less than 100 mm, and
the elastic polymer comprises an aqueous polyurethane, and a content ratio of the aqueous polyurethane is from 8 to 15 mass % in the artificial leather base material.

15. The artificial leather base material according to claim 14,
wherein at least one of the two types of resins is selected from the group consisting of a polyethylene terephthalate, a polybutylene terephthalate, a polyester elastomer, a polyamide-based resin, and modified products thereof.

16. The artificial leather base material according to claim 10,
wherein the average void area in a cross section in a thickness direction of the artificial leather base material is 400 to 1000 µm$^2$.

17. The artificial leather base material according to claim 1,
wherein the fibers (B) are ultrafine fibers having an average fineness of 0.05 dtex or more.

18. A napped artificial leather comprising the artificial leather base material according to claim 1,
wherein one side of the artificial leather base material is napped.

19. An artificial leather base material comprising:
a fiber base material consisting of a non-woven fabric that is an entangle body of fibers (A) and fibers (B); and
an elastic polymer applied inside the non-woven fabric,
wherein the fibers (A) are side-by-side fibers or eccentric sheath-core fibers, formed from two types of resins with intrinsic viscosities different from each other, in which a difference between the intrinsic viscosities of the two types of resins is 0.05 (dl/g) or more, and that are filaments having an average fineness of 0.6 dtex or more,
the fibers (B) are ultrafine fibers having an average fineness of less than 0.6 dtex, and that are staples having an average fiber length of less than 100 mm,
the elastic polymer comprises an aqueous polyurethane, and a content ratio of the aqueous polyurethane is from 8 to 15 mass % in the artificial leather base material, and
an average void area in a cross section in a thickness direction of the artificial leather base material is 300 to 1000 µm$^2$.

* * * * *